United States Patent [19]
Haruki et al.

[11] Patent Number: 5,282,022
[45] Date of Patent: Jan. 25, 1994

[54] WHITE BALANCE ADJUSTING APPARATUS FOR AUTOMATICALLY ADJUSTING WHITE BALANCE IN RESPONSE TO LUMINANCE INFORMATION SIGNAL AND COLOR INFORMATION SIGNAL OBTAINED FROM IMAGE SENSING DEVICE

[75] Inventors: Toshinobu Haruki, Shijonawate; Kenichi Kikuchi, Daito, both of Japan

[73] Assignee: Sanyo Electric Co., Ltd., Japan

[21] Appl. No.: 612,836

[22] Filed: Nov. 13, 1990

[30] Foreign Application Priority Data

| Nov. 17, 1989 | [JP] | Japan | 1-300240 |
| Feb. 7, 1990 | [JP] | Japan | 2-27471 |
| Feb. 7, 1990 | [JP] | Japan | 2-27472 |
| Mar. 2, 1990 | [JP] | Japan | 2-52045 |
| Mar. 23, 1990 | [JP] | Japan | 2-74402 |

[51] Int. Cl.⁵ .............................. H04N 9/73
[52] U.S. Cl. ........................................ 348/223
[58] Field of Search .............. 358/41, 29 C, 29, 228; H04N 9/73 C, 9/73 R

[56] References Cited

U.S. PATENT DOCUMENTS

| 4,709,259 | 11/1987 | Suzuki | 358/48 |
| 4,750,032 | 6/1988 | Nakayama | 358/29 |
| 4,809,061 | 2/1989 | Suzuki | 358/75 |
| 4,829,382 | 5/1989 | Hess et al. | 358/228 |
| 4,954,884 | 9/1990 | Nakayama et al. | 358/29 C |
| 5,049,997 | 9/1991 | Arai | 358/228 |

FOREIGN PATENT DOCUMENTS

| 0429992 | 6/1991 | European Pat. Off. ... H04N 9/73 C |
| 0433672 | 6/1991 | European Pat. Off. ... H04N 9/73 C |
| 2608881 | 7/1987 | France . |
| 52523 | 4/1977 | Japan | H04N 9/04 |
| 15381 | 1/1983 | Japan | H04N 9/04 |
| 0184079 | 8/1986 | Japan | H04N 9/73 C |
| 35792 | 2/1987 | Japan | H04N 9/73 |
| 62-35792 | 2/1987 | Japan . |
| 62-132490 | 6/1987 | Japan . |
| 0115489 | 5/1989 | Japan | H04N 9/73 C |
| 0060088 | 3/1989 | Japan | H04N 9/73 C |

Primary Examiner—James J. Groody
Assistant Examiner—Jeffrey S. Murrell
Attorney, Agent, or Firm—Peter L. Michaelson; Raymond R. Moser, Jr.

[57] ABSTRACT

Sixty-four regions are established on an image sensed picture from a video camera, where each evaluating value $r_{ij}$, $b_{ij}$, and $y_{ij}$ is obtained by averaging color difference signals R-Y and B-Y and luminance signal Y obtained from an image sensed signal over 1 field period for each region. When determination is made that luminance evaluating value $y_{ij}$ out of these evaluating values exceeds a predetermined value, the color evaluating values of the corresponding region are attenuated by a predetermined amount, in response to gain control signals derived from the color difference signals. As a result, the effect of an object of high luminance towards white balance adjustment is reduced.

25 Claims, 16 Drawing Sheets

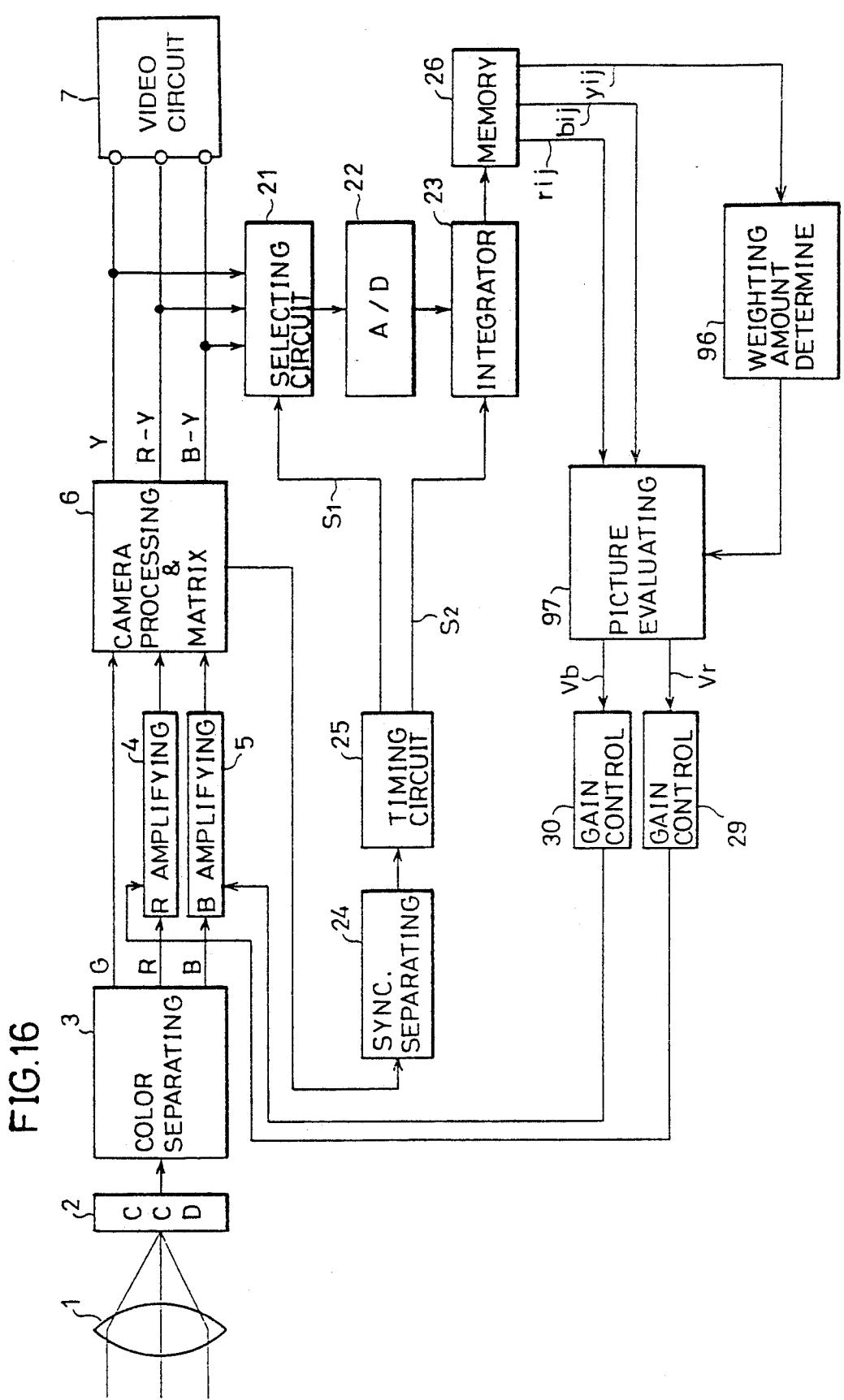

WHITE BALANCE ADJUSTING APPARATUS FOR AUTOMATICALLY ADJUSTING WHITE BALANCE IN RESPONSE TO LUMINANCE INFORMATION SIGNAL AND COLOR INFORMATION SIGNAL OBTAINED FROM IMAGE SENSING DEVICE

BACKGROUND OF THE INVENTION

1. Field of the Invention

The present invention relates to white balance adjusting apparatus, and more particularly to a white balance adjusting apparatus in an image sensing apparatus such as a color video camera for automatically adjusting white balance to correct the wavelength distribution of light differing by each light source, according to the luminance information signal and the color information signal within the image sensing signal obtained from an image sensing device.

2. Description of the Background Art

In taking an object using an image sensing apparatus such as a color video camera, the wavelength distribution of light illuminating the object from a light source differs by the type of the light source. For example, the blue components are intensive in light from a light source of relatively high temperature, whereas the red components are intensive in light from a light source of relatively low temperature. It is therefore necessary to correct the wavelength distribution of each light source in order to properly reproduce the color tone of the object itself illuminated with light of the light source on the screen of a color monitor television receiver. This correction is generally called white balance adjustment, where the gain of each color signal is adjusted so that the ratio of the amplitudes of the three primary color signals of red (hereinafter referred to as R), blue (hereinafter referred to as B), and green (hereinafter referred to as G) is 1:1:1.

In conventional image sensing apparatus, the detection of the three primary color signals R, G, and B is carried out according to light around the image sensing apparatus using a sensor provided for each color. However, white balance could not be adjusted correctly with such image sensing apparatus when the light source around the image sensing apparatus (for example, fluorescent light) differs from the light source illuminating the object (for example the sun), as in the case where an outdoor scene is taken from inside a room.

Recently, a method called TTL (through-the-lens) is proposed in which white balance adjustment is carried out, without providing separate sensors, according to color difference signals R-Y and B-Y within the image sensing signal obtained from an image sensing device. Such a method is disclosed in Japanese Patent Laying-Open No. 62-35792, for example. This method is based on the consideration that the object taken by an image sensing apparatus has various color area distribution (hereinafter referred to as the color distribution) and if this color distribution is averaged over a sufficient long time, the color components cancel each other to result in each color signal of "0", which is equivalent to taking a completely white picture. By controlling the gains of respective color signals so that the values resulting from integration of color difference signals R-Y and B-Y over one field period, for example, become 0, to correct the offset of the color tone due to wavelength distribution of light of the light source is corrected.

FIG. 1 is a block diagram showing an example of a conventional white balance adjusting apparatus by the TTL method. Referring to FIG. 1, light from an object (not shown) enters an image sensing device 2 formed of a CCD via a lens 1. The incident light is converted by a photoelectric device into an electric signal and provided to a color separating circuit 3. Color separating circuit 3 extracts the three primary color signals of R, G, and B from this electric signal. The extracted G signal is directly provided to a camera processing and matrix circuit 6. The R signal and B signal are provided to camera processing and matrix circuit 6 via a gain variable gain R amplifying circuit 4 and a B amplifying circuit 5, respectively. Camera processing and matrix circuit 6 creates a luminance signal Y and color difference signals R-Y and B-Y according to the three primary color signals of G, R, and B. The outputs are provided to a video circuit 7 where luminance signal Y and color difference signals R-Y and B-Y are subjected to the well-known process to create a recordable video signal. This recordable video signal is provided to a video recording circuit not shown.

The two color difference signals R-Y and B-Y are applied to integrating circuits 18 and 17, respectively, to be integrated over a sufficient long time, for example over 1 field period of a video signal. The values resulting from the integration are provided to gain control circuits 13 and 14. Gain control circuits 13 and 14 control the variable gains of B amplifying circuit 5 and R amplifying circuit 4 so that the values resulting from integration each becomes 0. This results in the amplitude ratio of 1:1:1 of the three primary color signals G, R, and B to adjust white balance.

In a conventional white balance adjusting apparatus of FIG. 1, there are some cases where at least one of the outputs of a plurality of light reception portions (not shown) provided for respective colors of R, G and B and constituting image sensing device 2 become saturated. Typically, saturation occurs when there is an object of significantly high luminance in a portion of the image sensed picture, such as in the case where a light source such as the sun is taken. Consequently, the amplitude ratio of the three primary color signals R, G, and B provided from color separating circuit 3 is not proportional to the actual R, G and B components included in the light source. Therefore, there is a problem when the white balance is offset in a direction not associated with the actual light source color temperature resulting from the white balance being adjusted according to improperly proportioned three primary color signals R, G, and B.

The conventional white balance adjusting apparatus of FIG. 1 corrects the irregularity of the wavelength distribution due to light of the light source, based on the consideration that colors cancel each other so that the reproduced picture can approximate a substantially white picture if the various color distributions of the object itself are averaged over a long period. This method is inaccurate when white balance regarding the object itself can not be achieved because the reproduced picture can not approximate a white picture even if the color distributions of the object included in the entire picture are averaged. This arises when the area ratio of the three primary colors within the picture is not equal, that is to say, when the color distribution is not even, such as in the case where green lawn or a blue sky occupies a large area of the picture, or in the case where a human object wearing a red sweater is taken in a close-up manner. If the above mentioned white balance adjustment is applied to such an unbalanced state of white balance, the gain will be controlled so as to cancel the intensive color. In the case of a close-up of a person wearing a red sweater, white balance will be unnecessarily intense in blue which is the complementary color of red, resulting in the color of the object being improperly reproduced on the reproduced screen.

Particularly, blue sky will be located in the upper end of an image sensed picture when taken outdoors. White balance of the entire picture will be intense in the side of the complementary color of blue. Because there are many cases where the blue sky is located at the upper end of a picture, it is desirable to consider an effective solution.

When the luminance of an object is extremely low, each level of the three primary color signals of R, G, and B will be reduced to aggravate the S/N ratio. This will unbalance the R, G, and B signal levels and generate color difference signals even though the actual object is black, i.e. achromatic color. In the conventional white balance adjusting apparatus of FIG. 1, the gains of signals R and B will be varied to cancel these inaccurate color difference signals, whereby white balance is intense in the complementary color side.

SUMMARY OF THE INVENTION

An object of the present invention is to provide a white balance adjusting apparatus capable of appropriate automatic white balance adjustment even in the case where there is an object of extremely high luminance in the picture.

Another object of the present invention is to provide a white balance adjusting apparatus capable of appropriate automatic white balance adjustment, even in the case where the color area distribution of an object is not even.

A further object of the present invention is to provide a white balance adjusting apparatus capable of appropriate automatic white balance adjustment, even in the case where there is an object of a specified color in specified regions of the picture.

A still further object of the present invention is to provide a white balance adjusting apparatus capable of appropriate automatic white balance adjustment even in the case where there is an object of extremely low luminance in the picture.

Briefly stated, the present invention is a white balance adjusting apparatus for automatically adjusting white balance according to a luminance information signal and a plurality of color information signals obtained from an image sensing apparatus having a lens and an image sensing device. The white balance adjusting apparatus includes an amplifying circuit, a region setting circuit, luminance evaluating value and color evaluating value converting circuit, a gain control circuit, and a weight reducing circuit. The amplifying circuit amplifies each of the color information signals with a corresponding variable gain. The region setting circuit divides the image sensed picture into a plurality of regions on the image sensed picture. The luminance evaluating value and color evaluating value converting circuit averages luminance information signal and respective ones of a plurality of color information signals to convert the same into a luminance evaluating value and color evaluating values for each of the plurality of regions. The gain control circuit is responsive to each color evaluating value of each of the plurality of regions and thereby controls the variable gain of the amplifying circuit. The weight reducing circuit reduces the contribution degree of each color evaluating value towards the control of the variable gain in regions where the luminance evaluating value is greater than a predetermined value.

In accordance with another aspect of the present invention, the weighing amount regarding the color evaluating values of each region is determined according to the luminance information signal of each region.

In accordance with a still further aspect of the present invention, the contribution degree towards variable gain control of color evaluating values in the corresponding specified regions is reduced, when the luminance evaluating value and the color evaluating value of a specified color in specified regions of the image sensed picture are greater than the respective predetermined values.

In accordance with another aspect of the present invention, the contribution degree towards variable gain control of each color evaluating value is reduced, in regions where the contrast evaluating value indicating the contrast of an object is smaller than a predetermined value.

In accordance with a further aspect of the present invention, the control of variable gain amplifier is limited according to the luminance information signal.

A main advantage of the present invention lies in that unnecessary offset of white balance of the picture is prevented even in the case where there is an object of high luminance in the picture.

Another advantage of the present invention lies in that white balance can be suppressed from being intense in the complementary color of the object, even in the case where the color area distribution of the object in the picture is not even.

A further advantage of the present invention lies in that white balance is not offset to cancel the corresponding specified color even in the case where an object of the specified color exists in the specified regions in the picture.

A still further advantage of the present invention lies in that unnecessary offset of white balance of the picture is suppressed even when there is an object of extremely low luminance in the picture.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 16 is a block diagram showing a white balance adjusting apparatus of a sixth embodiment of the present invention.

DESCRIPTION OF THE PREFERRED EMBODIMENTS

Figure 2:
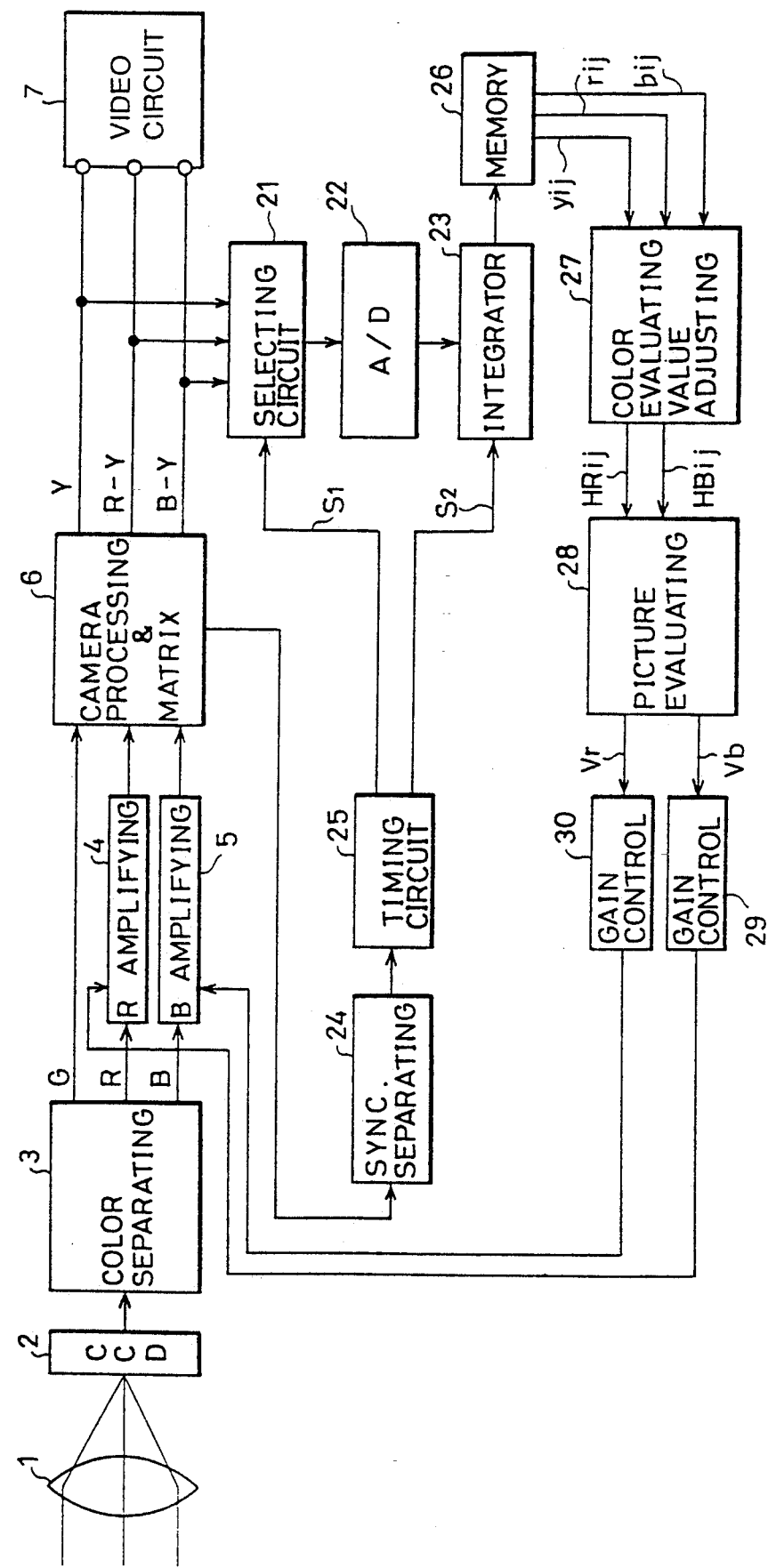
FIG. 2 is a block diagram of a white balance adjusting apparatus of a first embodiment of the present invention.

FIG. 2 is a block diagram showing a white balance adjusting apparatus of a first embodiment of the present invention. Referring to FIG. 2, light from an object (not shown) enters an image sensing device 2 formed of a CCD via a lens 1. The incident light is converted by a photoelectric device into an electric signal and applied to a color separating circuit 3. Color separating circuit 3 extracts the three primary color signals of R, G and B from the electric signal. The extracted G signal is directly provided to a camera processing and matrix circuit 6, whereas signals R and B are provided to camera processing and matrix circuit 6 via a gain variable R amplifying circuit 4 and a B amplifying circuit 5, respectively. Camera processing and matrix circuit 6 produces luminance signal Y and color difference signals R-Y and B-Y according to the three primary color signals of G, R and B, and provides the outputs to a video circuit 7. Well-known processing is carried out to generate luminance signal Y, and to generate color difference signals R-Y and B-Y in video circuit 7 to produce a recordable video signal. This signal is provided to a recording circuit not shown.

Simultaneously, each of signals Y, R-Y, and B-Y is provided to a selecting circuit 21. Selecting circuit 21 is responsive to a selection signal S1 produced by a timing circuit 25 according to a vertical synchronizing signal provided from a synchronizing separating circuit 24, to sequentially select one signal out of luminance signal Y, color difference signal R-Y, and color difference signal B-Y for each 1 field. In the embodiment of FIG. 2 for example, the luminance signal or the color difference signal is selected for each field in the order of (Y)→(R-Y)→(B-Y)→(Y)→(R-Y)→. . . . The selected signal is provided to the succeeding stage A/D converter 22.

A/D converter 22 samples one of signals Y, R-Y, and B-Y selected by selecting circuit 21 with a predetermined sampling period to convert that sampled signal into a digital value. The converted value is provided to an integrator 23.

Meanwhile, timing circuit 25 produces a switching signal S2 according to vertical and horizontal synchronizing signals provided from camera processing and matrix circuit 6, and the fixed output of an oscillator (not shown) for driving CCD 2. Switching signal S2 is provided to integrator 23. Integrator 23 is responsive to switching signal S2 to divide the image sensed picture into $8 \times 8 = 64$ rectangular regions $A_{11}, A_{12}, A_{13}, \ldots A_{ij}$ (i, j = an integer of 1-8) each of an identical area, for deriving the output of selecting circuit 21 in time divisional manner for each region.

More specifically, integrator 23 receives switching signal S2 to add the A/D converted values output from selecting circuit 21 over 1 field period for each region, i.e., digital-integrate the output of selecting circuit 21 for each region of the 64 regions, to hold the digital-integrated value corresponding to each region as a luminance evaluating value, or a color evaluating value in memory 26, after integration within 1 field period is completed. The digital-integrated value of luminance signal Y corresponding to respective ones of the 64 regions are obtained as 64 luminance evaluating values $y_{ij}$ (i, j:1-8) in an arbitrary field. In the next field where color difference signal R-Y is selected by selecting circuit 21, the digital-integrated values for respective regions of the color difference signal R-Y are obtained as 64 color evaluating values $r_{ij}$ as a result of integration for respective regions by integrator 23. At a further next field where color difference signal B-Y is selected by selecting circuit 21, the digital-integrated value for respective regions of color difference signal B-Y are obtained as 64 color evaluating values $b_{ij}$ as the result of integration for respective regions by integrator 23.

When integration of luminance signal Y, and color difference signals R-Y and B-Y over 3 field periods is completed, a total $64 \times 3 = 192$ of luminance evaluating value $y_{ij}$ and color evaluating values $r_{ij}$ and $b_{ij}$ are held in memory 26. Similar operation is repeated where a new luminance evaluating value $y_{ij}$ is applied to memory 26 at the next field. At a further next field, color evaluating value $r_{ij}$ is applied to memory 26. The luminance evaluating value and color evaluating values held in memory 26 are sequentially updated.

Figure 4:
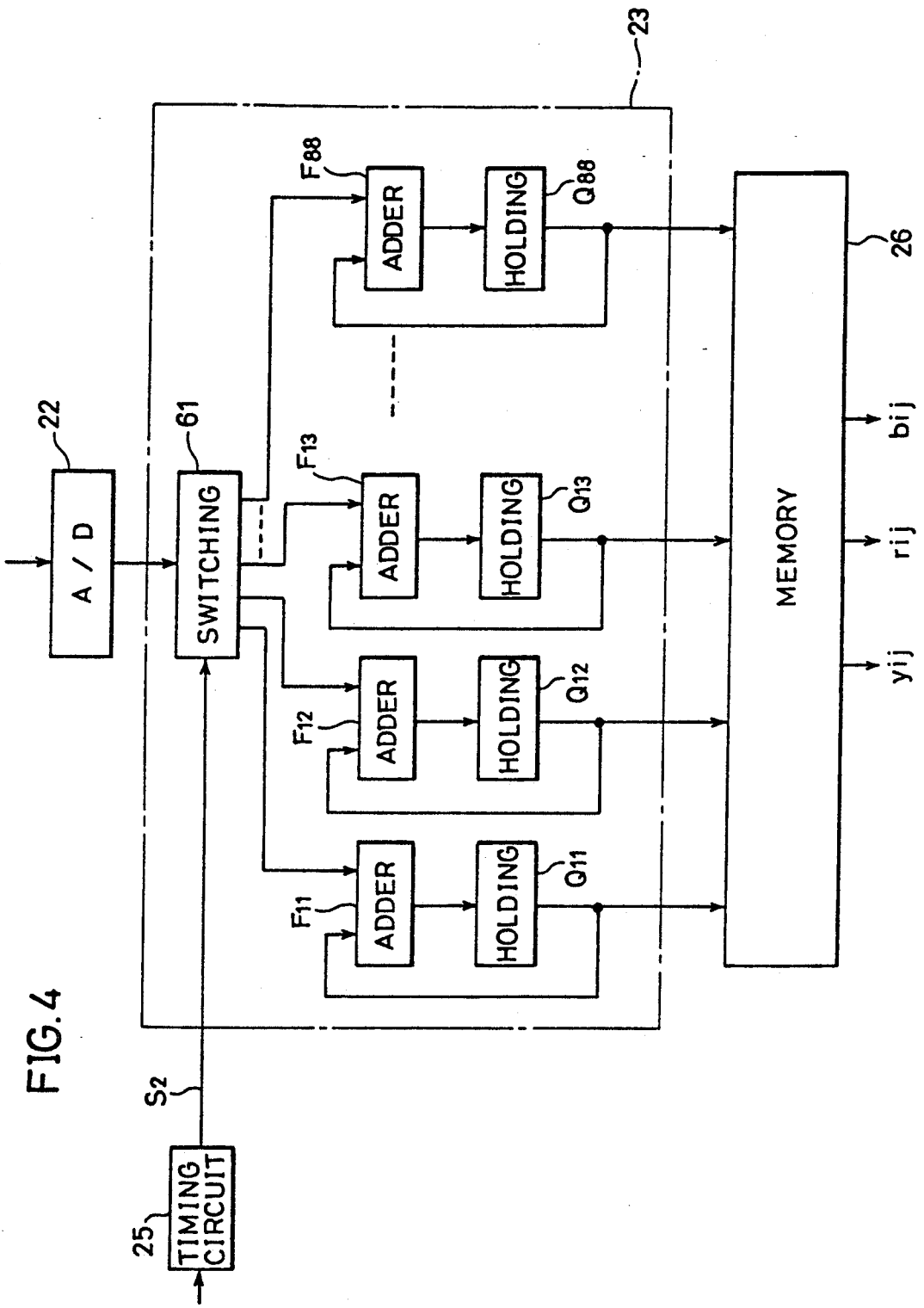
FIG. 4 is a block diagram showing the integrator of FIG. 2 in detail.

FIG. 4 is a block diagram of integrator 23 in detail. Each A/D converted data provided from A/D converter 22 is provided to a switching circuit 61. Switching circuit 61 receives switching signal S2 from timing circuit 25 for providing each A/D converted value into an adder corresponding to the region where the sampling point of the corresponding A/D converted data exists, out of the 64 adders $F_{11}, F_{12}, \ldots, F_{88}$ corresponding to the 64 regions $A_{11}, A_{12}, \ldots, A_{88}$. For example, if a sampling point of an arbitrary A/D converted data is included in region $A_{11}$, switching circuit 61 provides this data to adder $F_{11}$ corresponding to region $A_{11}$.

In the succeeding stage of each adder $F_{ij}$, a holding circuit $Q_{ij}$ is provided, where the output of each adder is first held in the corresponding holding circuit. The data held in each holding circuit is applied to a corresponding adder again and added with the next applied A/D converted data. Although each holding circuit $Q_{ij}$ is reset by each 1 field in response to a vertical synchronizing signal, only the data held immediately before reset is provided to memory 26. Thus, each digital integrating circuit is composed of an adder and a holding circuit. Accordingly, integrator 23 is composed of a total of 64 digital integrating circuits. This means that a digital-integrated value corresponding to each of 64 regions is applied to memory 26 from the holding circuit for each field.

The reference level, i.e. the 0 level, of each of the two color difference signals R-Y and B-Y provided to A/D converter 22 is set in advance to a level obtained when a complete achromatic color picture is taken. Therefore, the value obtained by A/D converting the color difference signal may take not only a positive value, but a negative value.

Referring to FIG. 2 again, the latest $y_{ij}$, $r_{ij}$, $b_{ij}$ calculated as in the above manner and held in memory 26 are provided to color evaluating value adjusting circuit 27. Color evaluating value adjusting circuit 27 determines whether the level of luminance evaluating value $y_{ij}$ of each region exceeds a predetermined value or not. When exceeding a predetermined value, the level of the color evaluating values of the corresponding region are reduced by a predetermined amount P.

Figure 5A:
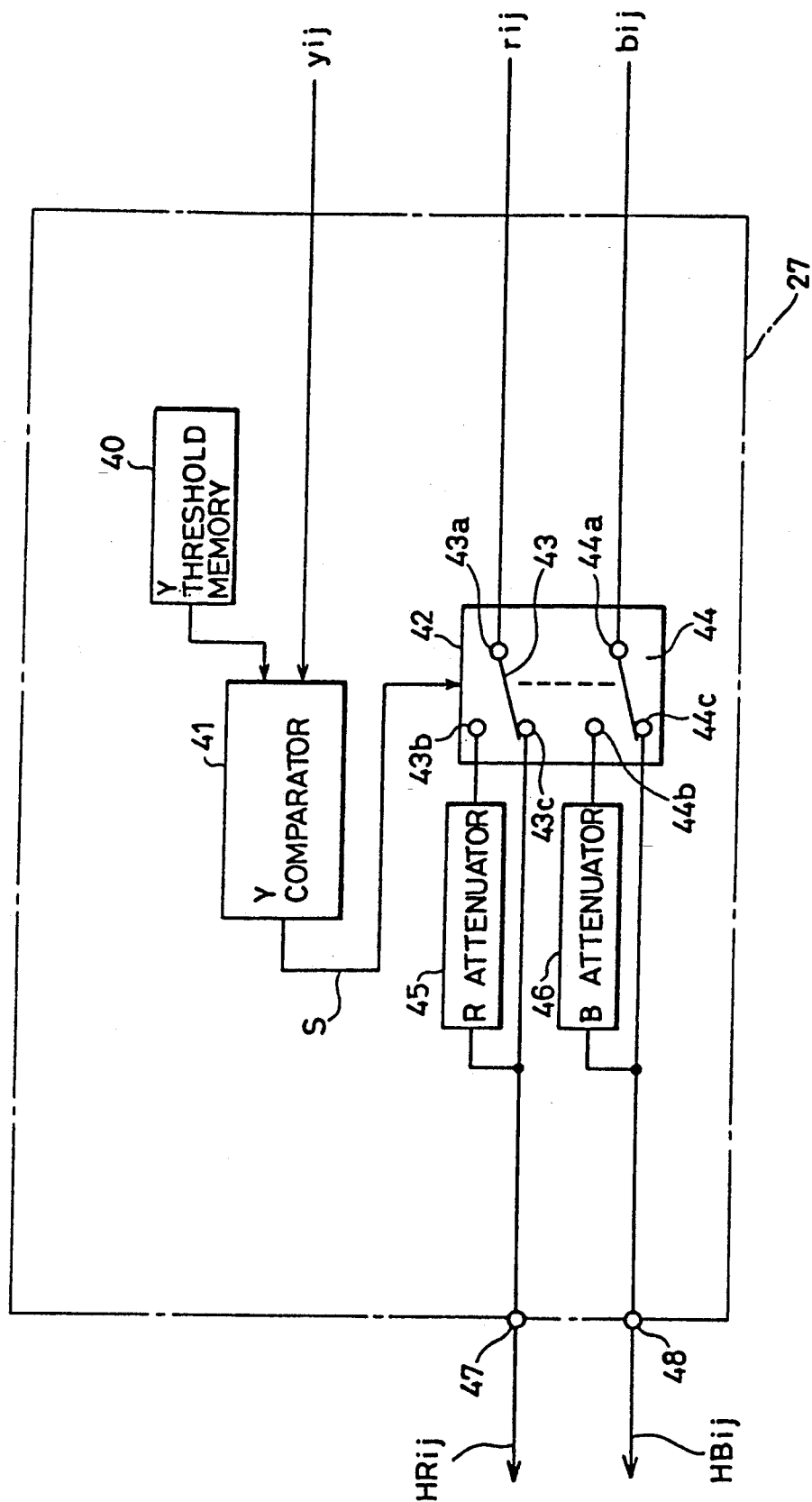
FIG. 5A is a block diagram showing the color evaluating value adjusting circuit of FIG. 2 in detail.

FIG. 5A is a block diagram of color evaluating value adjusting circuit 27. Referring to FIG. 5A, luminance evaluating value $y_{ij}$ of each region is provided to luminance comparator 41, to be compared with a luminance threshold value $N_y$ stored in advance in a luminance threshold value memory 40. Comparator 41 generates switching signal S of the H level when luminance evaluating value $y_{ij}$ is equal or greater than threshold value $N_y$, and of the L level, when less than threshold value $N_y$. The output is provided to switching circuit 42. This luminance threshold value $N_y$ is set according to an experiment in advance as a threshold value for identifying that any of the outputs of light reception portions of respective colors of R, G, and B of the image sensing device is saturated.

Switching circuit 42 is implemented with two switches 43 and 44. Switch 43 functions to selectively connected a fixed contact 43a to which color evaluating value $r_{ij}$ is applied to a fixed contact 43b coupled to R attenuator 45 or a fixed contact 43c coupled to output terminal 47. Switch 44 functions to selectively connected a fixed contact 44a to which color evaluating value $b_{ij}$ is applied to a fixed contact 44b coupled to B attenuator 46 or a fixed contact 44c coupled to output terminal 48.

Both switches 43 and 44 are controlled by switching signal S from luminance comparator 41. When switching signal S is at the L level, switches 43 and 44 are turned to the sides of fixed contacts 43c and 44c, where color evaluating values $r_{ij}$ and $b_{ij}$ are directly provided to output terminals 47 and 48 as adjusted color evaluating values $HR_{ij}$ an $HB_{ij}$, respectively. When switching signal S is at the H level, switches 43 and 44 are turned to the sides of fixed contact 43b and 44b, where color evaluating values $r_{ij}$ and $b_{ij}$ are provided to R and B attenuators 45 and 46.

R and B attenuators 45 and 46 subtract a predetermined constant amount P from the provided color evaluating values $r_{ij}$ and $b_{ij}$ to calculate $r_{ij}-P$ and $b_{ij}-P$. This is provided to output terminals 47 and 48 as adjusted color evaluating values $HR_{ij}$ and $HB_{ij}$, respectively. The constant amount P is a value obtained from an experiment in advance that can sufficiently identify that the picture quality is not unnatural when an object of high luminance is taken.

Referring to FIG. 5A, the operation of color evaluating value adjusting circuit 27 is explained hereinafter. When luminance evaluating value $y_{ij}$ of a region is provided to color evaluating value adjusting circuit 27, this luminance evaluating value $y_{ij}$ is compared with luminance threshold value $N_y$ by luminance comparator 41. When luminance evaluating value $y_{ij}$ is greater than the threshold value, determination is made that the object in the region is of high luminance to provide switching signal S of the H level to switching circuit 42. As a result, color evaluating values $r_{ij}$ and $b_{ij}$ are attenuated by a constant amount P by R and B attenuators 45 and 46 to be provided from output terminals 47 and 48. When luminance evaluating value $y_{ij}$ is smaller than threshold value $N_y$, a determination is made that the object is not of high luminance. Therefore, color evaluating values $r_{ij}$ and $b_{ij}$ are not attenuated and are directly provided at output terminals 47 and 48. Only the color evaluating values of the region where an object of high luminance exists are attenuated.

The attenuated or not attenuated color evaluating values $HR_{ij}$ and $HB_{ij}$ provided at output terminals 47 and 48 are provided to picture evaluating circuit 28 of FIG. 2, where color evaluating values of the entire picture regarding respective color different signals are calculated as picture color evaluating values $V_r$ and $V_b$, according to the following equations (1) and (2).

$$V_r = \sum_{i=j}^{8} \sum_{j=1}^{8} HR_{ij}/64 \quad (1)$$

$$V_b = \sum_{i=j}^{8} \sum_{j=1}^{8} HB_{ij}/64 \quad (2)$$

By equations (1) and (2), the average value of one region is derived as a picture color evaluating value which is a color evaluating value of the entire picture, by dividing the total sum of the adjusted color evaluating values of the 64 regions provided from color evaluating value adjusting circuit 27 by the total number of regions.

Gain control circuits 29 and 30 control the gains of R amplifying circuit 4 and B amplifying circuit 5 so that both picture color evaluating values $V_r$ and $V_b$ become 0. When picture color evaluating values $V_r$ and $V_b$ become 0, white balance adjustment is completed.

Although the color evaluating value itself is directly corrected according to the adjusting process by color evaluating value adjusting circuit 27 in the embodiment of FIG. 2, it is possible to obtain similar results by weighting color evaluating values with a constant weighing amount in a general state, and only reducing the weighing amount regarding color evaluating values of high luminance.

Figure 5B:
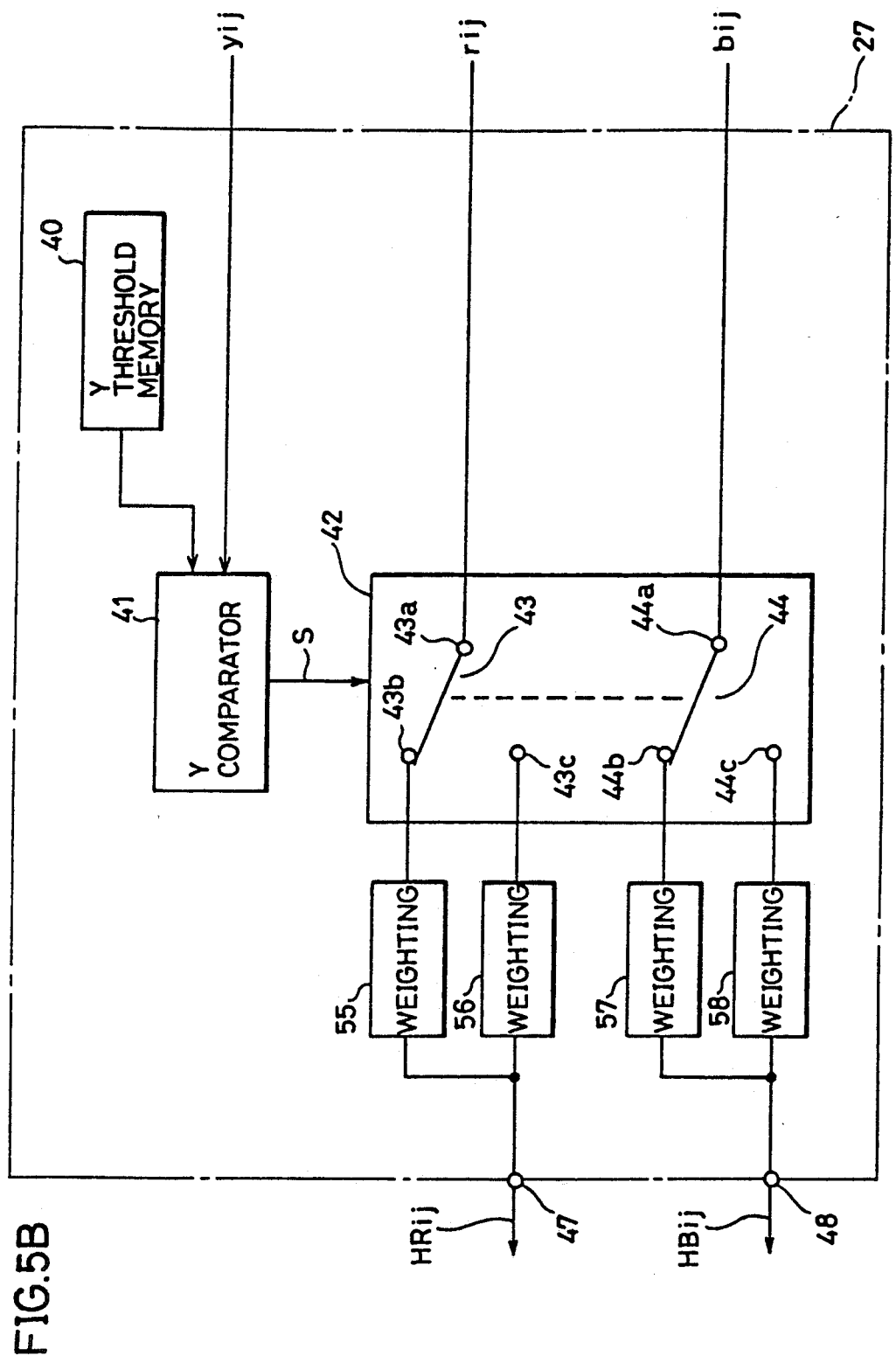
FIG. 5B is a block diagram showing another color evaluating value adjusting circuit of FIG. 2.

FIG. 5B is a block diagram showing another example of color evaluating value adjusting circuit 27.

Regarding regions other than the high luminance regions, a predetermined weighting amount D1 is weighted on color evaluating values by weighting circuits 56 and 58, that is to say, the multiplication of $r_{ij} \times D1$ and $b_{ij} \times D1$ is performed. Regarding regions of high luminance, weighting amount D2 smaller than weighting amount D1 is weighted by weighting circuits 55 and 57, that is to say, the multiplication of $r_{ij} \times D2$ and $b_{ij} \times D2$ is performed. By providing these multiplied values as the modified color evaluating values of each region, it is possible to reduce the contribution degree towards white balance adjustment of the entire picture regarding regions satisfying the condition of $y_{ij} > N_y$.

According to the first embodiment of the present invention, it is possible to prevent offset of the white balance adjustment and achieve appropriate white balance adjustment by reducing the contribution degree of color evaluating values of high luminance-portions towards white balance adjustment. This can be accomplished even in the case where a scene including a portion having high luminance not suitable for white balance adjustment is taken.

Figure 6:
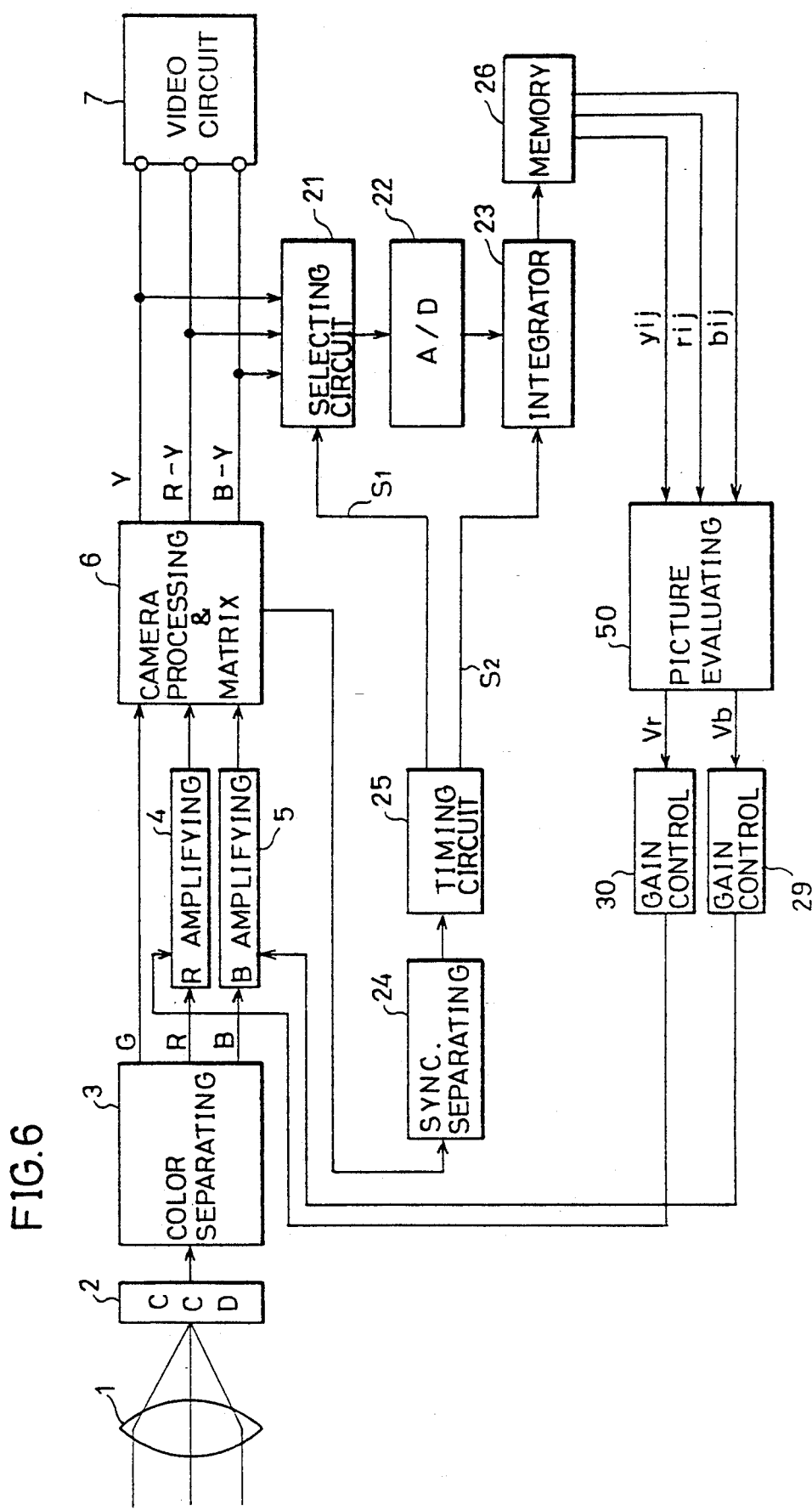
FIG. 6 is a block diagram showing a white balance adjusting apparatus of a second embodiment of the present invention.

FIG. 6 is a block diagram of a white balance adjusting apparatus according to a second embodiment of the present invention. The second embodiment of FIG. 6 is identical to the first embodiment of FIG. 2, except for the following points. That is to say, a picture evaluating circuit 50 is provided instead of color evaluating value adjusting circuit 27 and color evaluating circuit 28 of FIG. 2.

Picture evaluating circuit 50 of FIG. 6 fetches the latest evaluating values $y_{ij}$, $r_{ij}$, and $b_{ij}$ (i, j:1-8) from memory 26 to calculate the color evaluating values of the entire picture, $V_r$ and $V_b$, regarding color difference signals R-Y and B-Y. Picture color evaluating values $V_r$ and $V_b$ are calculated according to the following equations (3) and (4).

$$V_r = \sum_{i=j}^{8}\sum_{j=1}^{8} (r_{ij} \times y_{ij}) / \sum_{i=j}^{8}\sum_{j=1}^{8} y_{ij} \quad (3)$$

$$V_b = \sum_{i=j}^{8}\sum_{j=1}^{8} (b_{ij} \times y_{ij}) / \sum_{i=j}^{8}\sum_{j=1}^{8} y_{ij} \quad (4)$$

The above equations will be explained hereinafter briefly. Equations (3) and (4) are equations multiplying and summing color evaluating values $r_{ij}$ and $b_{ij}$ of respective color difference signals by luminance evaluating value $y_{ij}$, considering that chroma is higher in portions where the luminance level is high, and likely to be white. In the above equation (3), $$\sum_{i=1}^{8}\sum_{j=1}^{8} (r_{ij} \times y_{ij})$$

is the total sum of the multiplication results of all 64 regions upon applying weight to color evaluating value $r_{ij}$ of color difference signal R-Y in proportion to the luminance level. In other words, the weighting is accomplished by multiplying color evaluating value $r_{ij}$ of the 64 regions by the corresponding luminance evaluating value $y_{ij}$.

However, normalization of the weighing amount is not carried out only with the above $$\sum_{i=1}^{8}\sum_{j=1}^{8} (r_{ij} \times y_{ij})$$

That is to say, the factor that a region having high luminance level occupies a large area in the picture will increase the color evaluating values of the entire screen.

Hence, normalization of the weighing amount is accomplished by dividing the above mentioned total sum of $$\sum_{i=1}^{8}\sum_{j=1}^{8} (r_{ij} \times y_{ij})$$

by the total sum of $$\sum_{i=1}^{8}\sum_{j=1}^{8} y_{ij}$$

which is the total sum of the weighing amount of all regions. By multiplying and summing color evaluating value $r_{ij}$ of the color difference signal over the entire picture using weighing amount $y_{ij}$, a picture color evaluating value $V_r$ having area factors removed is derived.

In a situation where half of the regions forming an image sensed picture, i.e., 32 regions of the 64 regions, have an object of color evaluating value $r_{ij}=10$ of color difference signal R-Y and luminance evaluating value $y_{ij}=10$, with the remaining 32 regions completely of black color ($y_{ij}=0$), the following total sum is obtained:

$$\sum_{i=1}^{8}\sum_{j=1}^{8} (r_{ij} \times y_{ij}) = 10 \times 10 \times 32 = 3200$$

Therefore, if normalization is not carried out with the weighing amount, the color evaluating value of the entire picture is calculated as 3200, whereby white balance adjustment is carried out according to this value.

Assuming another situation where an object identical to the above mentioned object, i.e. an object of $r_{ij}=10$ and $y_{ij}=10$, exists in regions corresponding to ¼ of the image sensed picture, i.e. in 16 regions, and the remaining regions are completely black, the following total sum is derived:

$$\sum_{i=1}^{8}\sum_{j=1}^{8} (r_{ij} \times y_{ij}) = 10 \times 10 \times 16 = 1600$$

Because the object is completely identical and the regions where the object does not exist is completely a black level in either of the two situations, white balance adjustment must be carried out with respect to the identical object in either case. This means that the white balance adjustment amount must be the same adjusting amount even if the area ratio occupied by the object in the image sensed picture differs. There must not be a difference regarding picture color evaluating values according to the area ratio of the high luminance level regions in the picture, such as the above 3200 and 1600. By dividing 3200 and 1600 by $$\sum_{i=1}^{8}\sum_{j=1}^{8} y_{ij} = 10 \times 32 = 320 \text{ and}$$

$$\sum_{i=1}^{8}\sum_{j=1}^{8} y_{ij} = 10 \times 16 = 160, \text{ respectively, for}$$

normalization by the total weighing amount, picture evaluating value $V_r$ will become $V_r = 3200/320 = 1600/160 = 10$ in either case, to adjust white balance with identical adjusting amount regarding R components.

Similarly, the above equation (4) can derive the normalized color evaluating value of the entire picture as picture color evaluating value $V_b$, by adding and multiplying color evaluating value $b_{ij}$ of color difference signal B-Y of each region over the entire picture by luminance evaluating value $y_{ij}$.

Referring to FIG. 6 again, gain control circuits 29 and 30 control the respective gains of R amplifying circuit 4 and B amplifying circuit 5 so that picture color evaluating values $V_r$ and $V_b$ both become 0 which are the color evaluating values regarding the entire picture. When picture color evaluating values $V_r$ and $V_b$ become 0, white balance adjustment is completed.

According to the second embodiment of the present invention, it is possible to suppress the offset of white balance to the complementary color side to improve the reproduction of the actual color of the object, by increasing the effect of color signals in regions of high luminance towards white balance adjustment. This process is effective even when the color distribution of the image sensed picture is not even.

Figure 7:
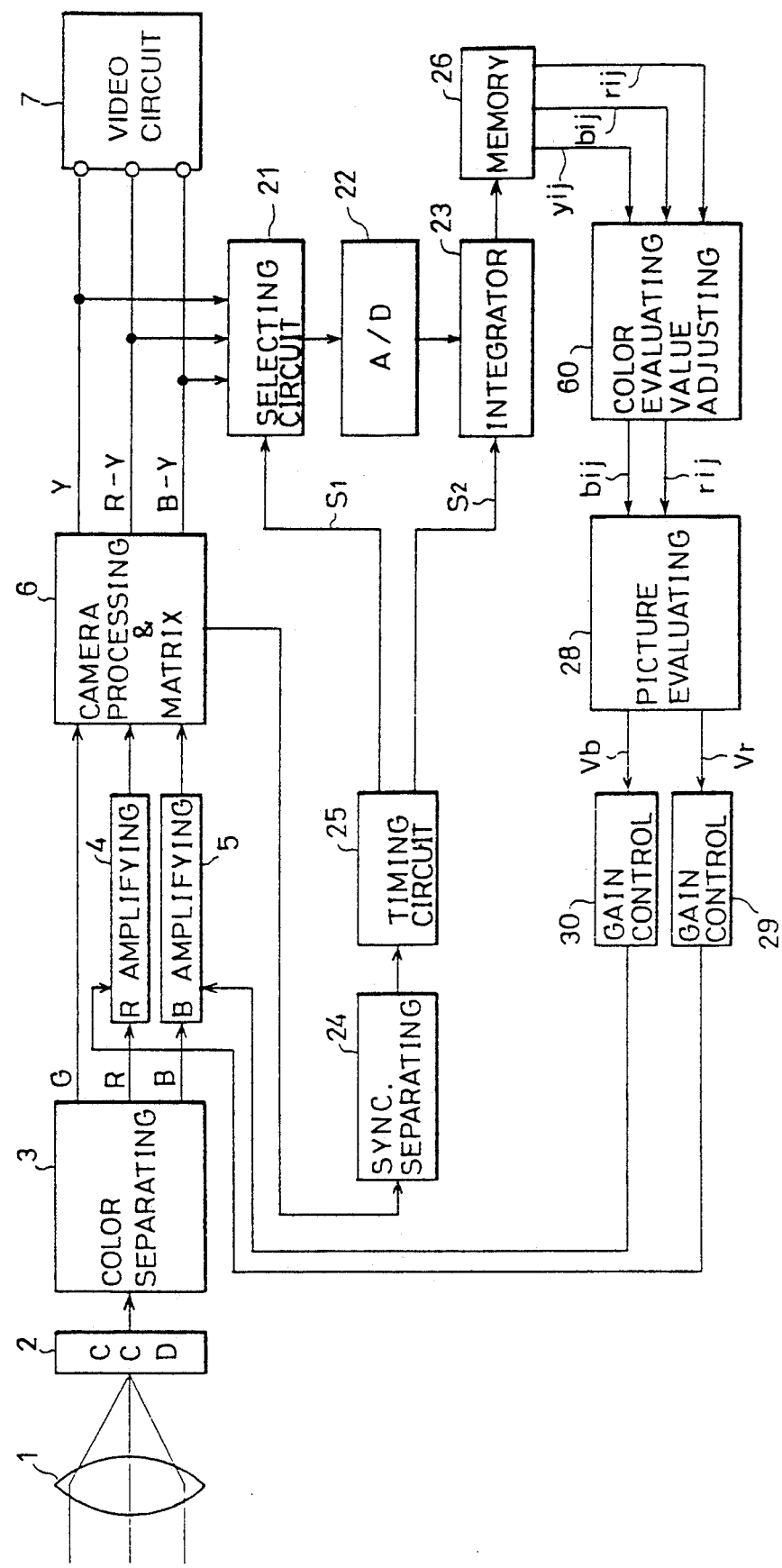
FIG. 7 is a block diagram showing a white balance adjusting apparatus of a third embodiment of the present invention.

FIG. 7 is a block diagram showing a third embodiment of the present invention. The third embodiment of FIG. 7 is the same as the first embodiment of FIG. 2, except for the following points. That is to say, a color evaluating value adjusting circuit 60 is provided instead of color evaluating value adjusting circuit 27 of FIG. 2. Evaluating values $y_{ij}$, $r_{ij}$, $b_{ij}$ held in memory 26 are provided to color evaluating value adjusting circuit 60.

Color evaluating value adjusting circuit 60 determines whether an object having a particular luminance level and a specified color exists in the specified regions previously selected out of the 64 regions. When such an object exists, the color evaluating value level of the corresponding region is reduced by a predetermined amount Z.

In general, there is high probability that blue sky is located at the upper side of the image sensed picture when taken outdoors. Blue sky is an object in which the luminance level is relatively high and which color difference signal B-Y is significantly high. It is probable that the picture will be intense in the blue components over the entire picture. In the third embodiment, the 16 regions in the 2 topmost rows of the picture are selected as the specified regions with blue as the specified color.

Figure 8:
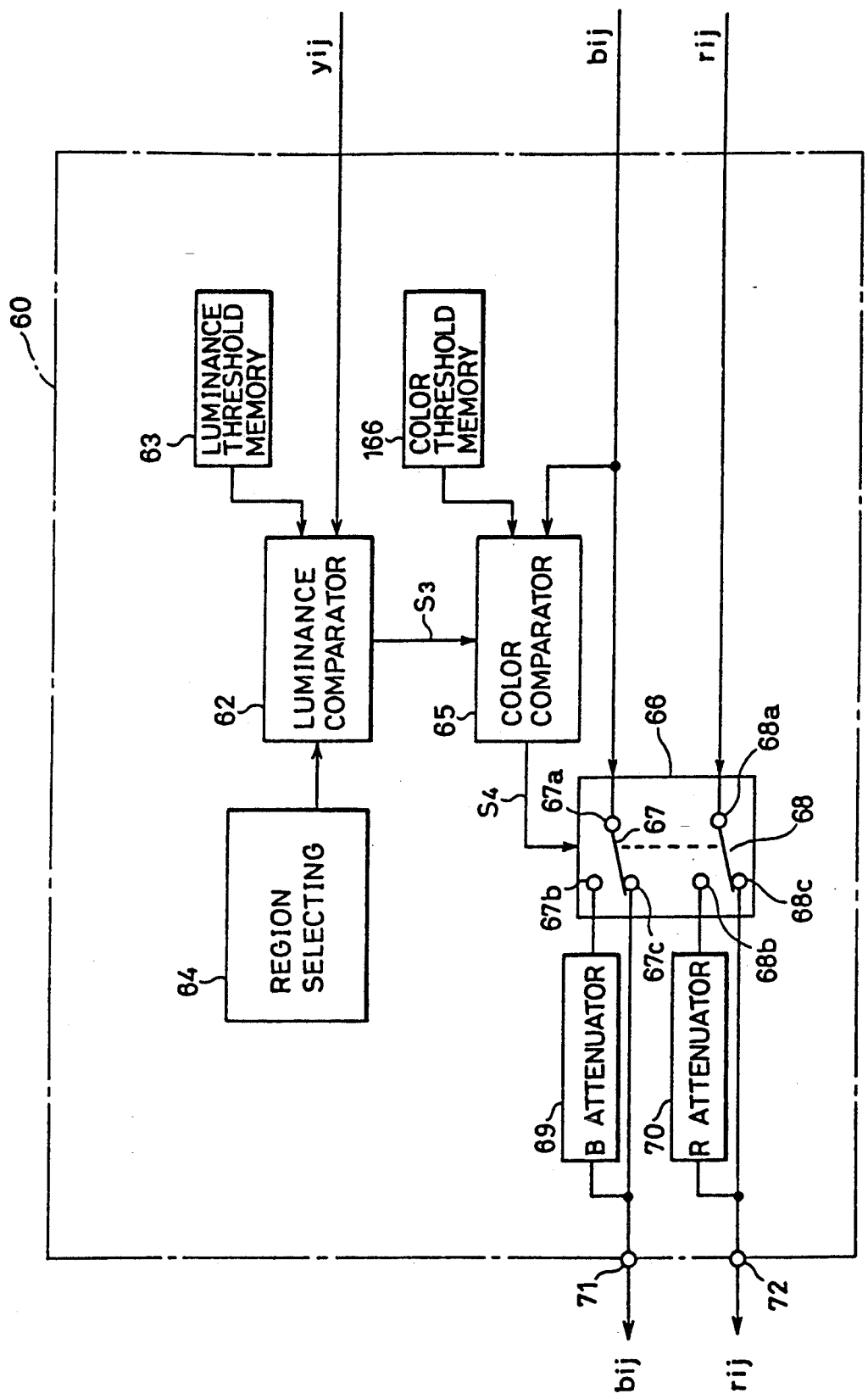
FIG. 8 is a block diagram showing the color evaluating value adjusting circuit of FIG. 7 in detail.

FIG. 8 is a block diagram of the color evaluating value adjusting circuit 60 of FIG. 7.

Referring to FIG. 8, luminance evaluating value $y_{ij}$ of each region is applied to luminance comparator 62 from the topmost region in the order of $y_{11} \rightarrow y_{12} \rightarrow \ldots y_{18} \rightarrow y_{21} \rightarrow \ldots \rightarrow y_{88}$, to be compared with luminance threshold value $n_y$ stored in luminance threshold value memory 63 in advance. The comparison operation by luminance comparator 62 is carried out only when the luminance evaluating value from the region selected in advance by region selecting circuit 64 is applied. In the third embodiment, the above mentioned blue sky is recognized as an object of the specified color, where the regions specified by region selecting circuit 64 are set to 16 regions $A_{11}, A_{12} \ldots A_{28}$ corresponding to the topmost 2 rows of the image sensed picture. Therefore, the comparison operation by luminance comparator 62 is carried out with respect to only the luminance evaluating values of the 16 regions. As a result of the comparison operation, comparison signal S3 of a H level associated with the corresponding region is generated from luminance comparator 62, when determination is made that luminance evaluating value $y_{ij}$ is greater than luminance threshold value $n_y$.

Color comparator 65 compares the levels of color evaluating value $b_{ij}$ and B threshold value $N_b$ stored in color threshold value memory 166, only when comparison signal S3 is at the H level. Only the color evaluating values $b_{ij}$ of the regions where the luminance evaluating value is determined to be greater than luminance threshold value $n_y$ by comparison of luminance comparator 62 will be compared with B threshold value $N_b$. As a result of the comparison operation, comparison signal S4 of a H level is generated regarding the corresponding region from color comparator 65 only when color evaluating value $b_{ij}$ is greater than B threshold value $N_b$.

Referring to FIG. 8, switching circuit 66 is comprised of two switches 67 and 68. Switch 67 functions to selectively connect a fixed contact 67a to which color evaluating value $b_{ij}$ is applied to a fixed contact 67b coupled to B attenuator 69 or a fixed contact 67c coupled to output terminal 71. Switch 68 functions to selectively connect a fixed contact 68a to which color evaluating value $r_{ij}$ is applied to a fixed contact 68b coupled to R attenuator 70 or a fixed contact 68c coupled to output terminal 72.

Switches 67 and 68 are switch controlled synchronously with comparison signal S4 as a switching signal. When comparison signal S4 is at the L level, switches 67 and 68 are switched to the sides of fixed contacts 67c and 68c, where color evaluating values $b_{ij}$ and $r_{ij}$ of the corresponding region are directly provided to output terminals 71 and 72 without being attenuated. When switching signal S4 is at the H level, switches 67 and 68 are switched to the sides of fixed contact 67b and 68b, respectively, where color evaluating values $b_{ij}$ and $r_{ij}$ of the corresponding region are applied to B and R attenuators 69 and 70, respectively.

B and R attenuators 69 and 70 subtract a predetermined amount Z from the applied color evaluating values $b_{ij}$ and $r_{ij}$ to derive $b_{ij}-Z$ and $r_{ij}-Z$. The results are provided to output terminals 71 and 72.

Regarding regions $A_{11}, A_{12}, \ldots, A_{28}$ selected in advance, color evaluating value adjusting circuit 60 makes the determination as whether:

(I) the object has sufficient luminance level where luminance evaluating value $y_{ij}$ ($i=1, 2$: $j=1-8$) is greater than luminance threshold value $n_y$, and also (II) the object has significantly intense blue components, where color evaluating value $b_{ij}$ ($i=1, 2$: $j= 1-8$) is greater than B threshold value $N_b$, where the evaluating value adjusting operation is carried out to attenuate color evaluating values $b_{ij}$ and $r_{ij}$ by a predetermined amount Z regarding the region satisfying both (I) and (II).

Luminance and color evaluating values $y_{ij}$, $b_{ij}$, and $r_{ij}$ are provided to color evaluating value adjusting circuit 60 synchronously from memory 26 for every identical region. The operation within color evaluating value adjusting circuit 60 is carried out sequentially for all 64 regions.

Threshold values $n_y$ and $N_b$ are values set according to observation data for recognizing blue sky. The attenuating amount Z is a value set according to an observation value where appropriate white balance is implemented in an image sensing state having blue sky in the selected regions of $A_{11}, \ldots, A_{28}$.

The attenuated or not attenuated color evaluating values $b_{ij}$ and $r_{ij}$ provided from output terminals 71 and 72 are applied to picture evaluating circuit 28. Therein the color evaluating values of the entire picture regarding respective color difference signals are calculated as picture color evaluating value $V_r$ and $V_b$ according to the following equations (5) and (6).

$$V_r = \sum_{i=1}^{8} \sum_{j=1}^{8} r_{ij}/64 \qquad (5)$$

$$V_b = \sum_{i=1}^{8} \sum_{j=1}^{8} b_{ij}/64 \qquad (6)$$

According to equations (5) and (6), the total sum of each of the adjusted color evaluating values $r_{ij}$ and $b_{ij}$ of the 64 regions provided from color evaluating value adjusting circuit 60 is divided by the number of regions to derive the average value of one region as the color evaluating value which is the color evaluating values concerning the entire picture.

Gain control circuits 29 and 30 control each gain of R amplifying circuit 4 and B amplifying circuit 5 so that picture color evaluating values $V_r$ and $V_b$ both become 0. When picture evaluating values $V_r$ and $V_b$ both become 0, white balance adjustment is completed.

According to the third embodiment of the present invention, specified regions are set in the upper side of the picture and blue is selected as the specified color. The effect of blue components of the blue sky towards white balance adjustment can be suppressed to prevent white balance of the entire picture from being intense in the complementary color side of blue. The effect is minimized even when blue sky exists in the image sensed picture. The specified region and the specified color can be selected arbitrarily. For example, it is possible to suppress the effect of red components of a sunset towards white balance adjustment to prevent white balance from being intense in the complementary color of red, by setting the specified regions in the upper side of the picture and select red as the specified color, and by applying color evaluating value $r_{ij}$ instead of $b_{ij}$ to color comparator 65 of FIG. 8.

Figure 9:
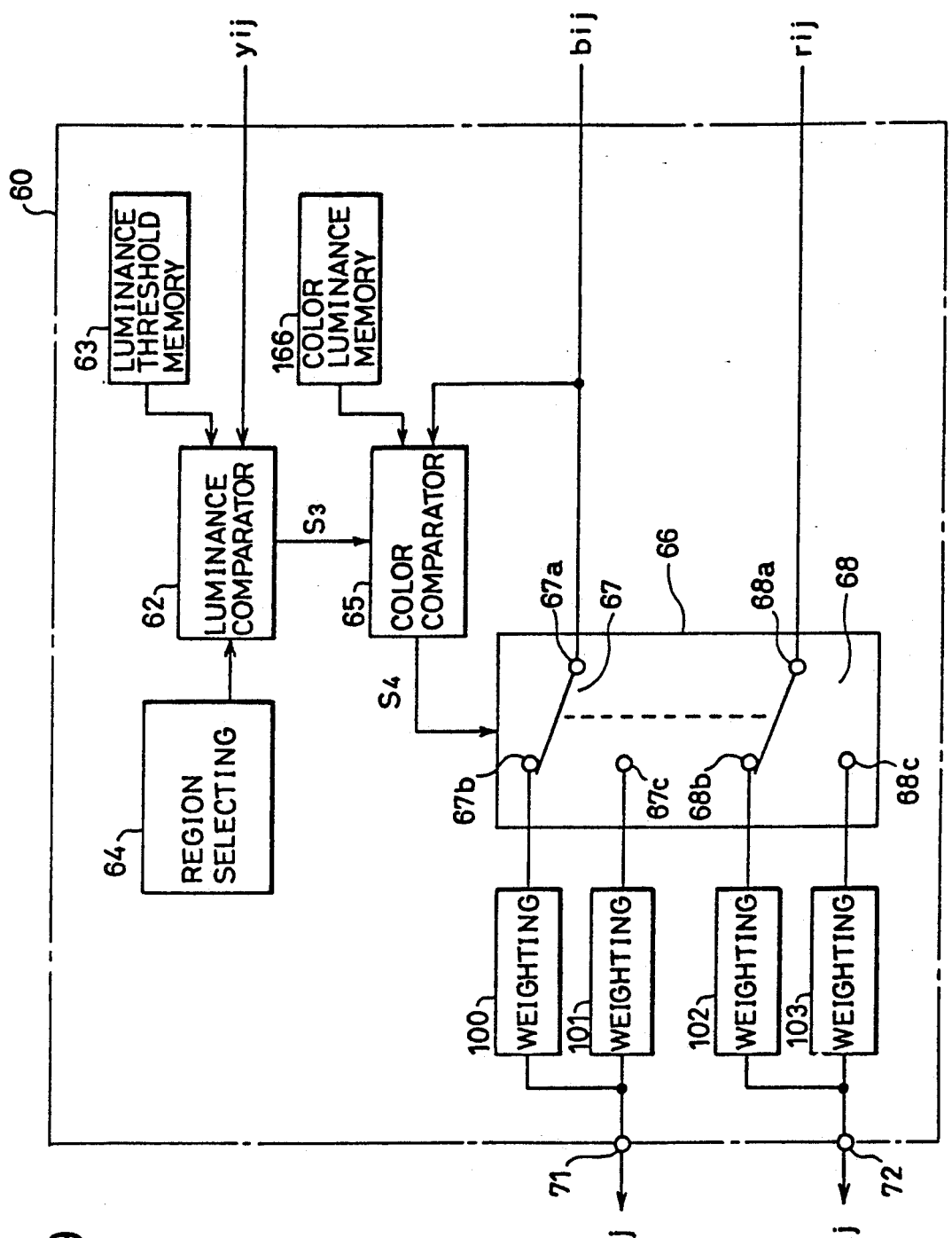
FIG. 9 is a block diagram showing another example of a color evaluating value adjusting circuit of FIG. 7.

FIG. 9 is a block diagram showing another example of the color evaluating value adjusting circuit 60 of FIG. 7. In the embodiment of FIG. 8, an approach was shown where a predetermined attenuating amount Z is subtracted from color evaluating values $r_{ij}$ and $b_{ij}$ as an example of adjusting operation of color evaluating values in color evaluating value adjusting circuit 60. In the embodiment of FIG. 9, an approach is employed where a variable weighting amount is used.

Regarding regions where comparison signal S4 is at the L level, a predetermined weighting amount D1' is weighted on color evaluating values by weighting circuits 101 and 103, that is to say, the multiplications of $r_{ij} \times D1'$ and $b_{ij} \times D1'$ are carried out. Regarding regions having H level comparison signal S4, weighting amount D2' smaller than weighting amount D1' is weighted by weighting circuits 100 and 102, that is to say, the multiplication of $r_{ij} \times D2'$ and $b_{ij} \times D2'$ are carried out. By providing these multiplied values as the modified color evaluating values of each region, it is possible to reduce the contribution degree towards white balance adjustment of the entire picture regarding regions satisfying both the conditions of $y_{ij} > n_y$ and $b_{ij} > N_b$.

It is possible to implement a button by which an operator can adjust proper white balance under various image sensing situations by selecting of the specified region and color.

According to the third embodiment of the present invention, the luminance degree towards white balance adjustment is reduced in situations where an object of the specified color exists in the specified regions. The inventive adjustment is used to suppress the white balance from being intense in the complementary side of a particular color.

Figure 10:
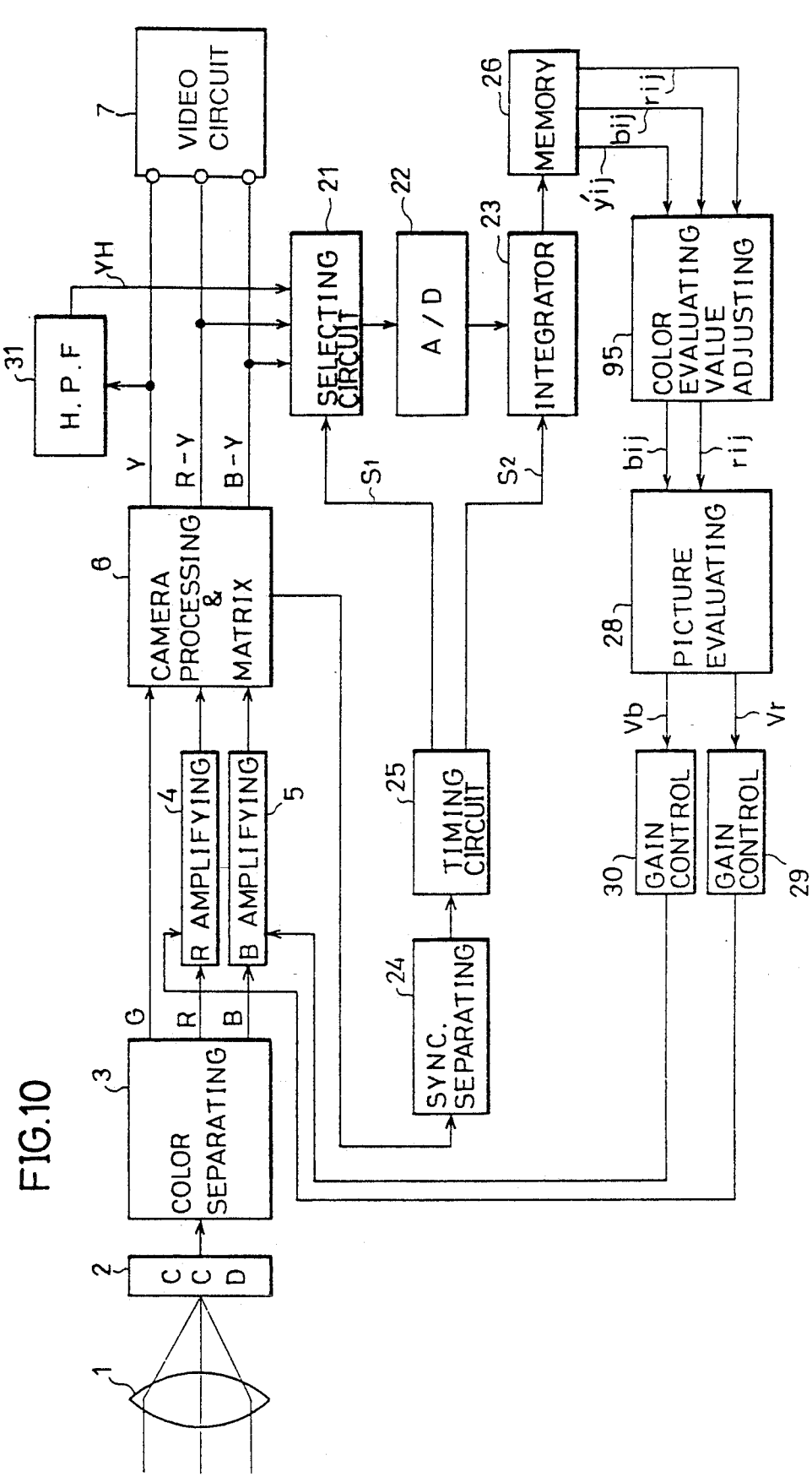
FIG. 10 is a block diagram showing a white balance adjusting apparatus of a fourth embodiment of the present invention.

FIG. 10 is a block diagram showing a white balance adjusting apparatus of a fourth embodiment of the present invention. The fourth embodiment of FIG. 10 is identical to the first embodiment of FIG. 2 except for the following points. That is, luminance signal Y provided from camera processing and matrix circuit 6 is provided to a high pass filter (HPF) 31, where only the high frequency component YH is extracted and provided to selecting circuit 21. High frequency component YH increases in proportion to the contrast of the picture, that is to say, is greatest at the boundaries of objects in the picture. High frequency component YH is reduced as the contrast of the picture is lowered, that is to say, is lowest in portions of single color in the image sensed picture.

Selecting signal circuit 21 is responsive to selection signal S1 produced in timing circuit 25 according to the vertical synchronizing signal provided from synchronizing separating circuit 24 to sequentially select any of luminance high frequency component YH, color difference signal R-Y and color difference signal B-Y for each 1 field. For example, in the embodiment of FIG. 10, the luminance high frequency component or the color difference signals is selected by 1 field in the order of (YH)→(R-Y)→(B-Y)→(YH)→(R-Y)→. . . , where the output is provided to A/D converter 22 of the succeeding stage.

A/D converter 22 samples signal YH or R-Y or B-Y selected by selecting circuit 21 with a predetermined sampling period to convert the same into a digital value. This digital value is provided to integrator 23.

Integrator 23 receives switching signal S2 to add the A/D converted values over 1 field period for every region, that is to say, digital-integrate the output of selecting signal circuit 21 for each of the 64 regions. The digital-integrated value corresponding to each region is held in memory 26 as the contrast evaluating value or color evaluating value, after the integration over 1 field period is completed. As a result, the digital-integrated values of luminance high frequency band component YH corresponding to respective ones of 64 the regions of an arbitrary field are obtained as 64 contrast evaluating values $y'_{ij}$ (i,j:1-8). In the next field, color difference signal R-Y selected by selecting circuit 21 is integrated by integrator 23 for respective regions, where the digital-integrated values of color difference signal R-Y of respective regions are obtained as 64 color evaluating values $r_{ij}$. In the next field, color difference signal B-Y selected by selecting circuit 21 is integrated by integrator 23 for respective regions, where the digital-integrated values of color difference signal B-Y for respective regions are obtained as 64 color evaluating values $b_{ij}$.

Thus, a total of $64 \times 3 = 194$ of the contrast evaluating values $y'_{ij}$ and color evaluating values $r_{ij}$ and $b_{ij}$ are held in memory 26, when integration over 3 field periods regarding luminance high frequency component YH, color difference signal R-Y, and color difference signal B-Y is completed. The foregoing operation is repeated, whereby a new contrast evaluating value $y'_{ij}$ is provided to memory 26 for the next field, and color evaluating value $r_{ij}$ is provided to memory 26 are at a further next field. The contrast evaluating value and color evaluating values held in memory 26 are updated sequentially. The latest evaluating values $y'_{ij}$, $r_{ij}$, $b_{ij}$ calculated in the above manner and held in memory 26 are provided to color evaluating value adjusting circuit 95 of the succeeding stage.

Color evaluating value adjusting circuit 95 functions to determine whether a single color object exists or not in each region according to the magnitude of the contrast evaluating value. That is to say, color evaluating value adjusting circuit 95 functions to attenuate color evaluating values $r_{ij}$ and $b_{ij}$ of the corresponding. Circuit 95 reduces the contribution degree of the corresponding region towards white balance adjustment regarding the region where the contrast evaluating value is low, i.e., a single color region.

Figure 11:
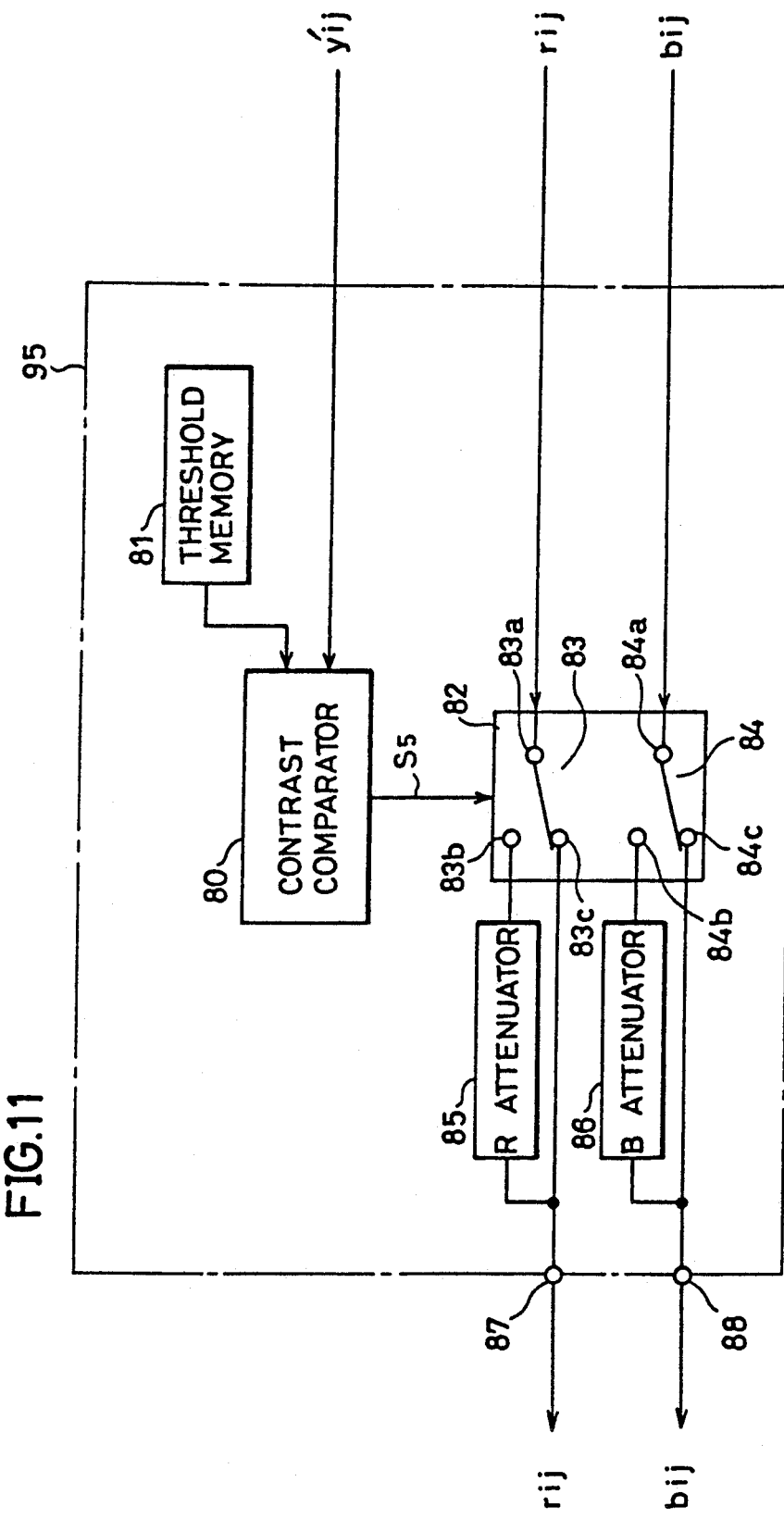
FIG. 11 is a block diagram of the color evaluating value adjusting circuit of FIG. 10 in detail.

FIG. 11 is a block diagram of color evaluating value adjusting circuit 95. Referring to FIG. 11, contrast evaluating value $y'_{ij}$ of each region is applied to a contrast comparator 80 starting from the top row region in the order of $y'_{11} \to y'_{12} \to \ldots, y'_{18}, y'_{21} \to \ldots \to y'_{88}$, to be sequentially compared with contrast threshold value N. The threshold values N are stored in a threshold value memory 81 in advance. When contrast evaluating value $y'_{ij}$ is smaller than contrast threshold value N, comparison signal S5 of a H level is generated and provided to switching circuit 82.

Switching circuit 82 is constituted by two switches 83 and 84. Switch 83 functions to selectively connect a fixed contact 83a to which color evaluating value $r_{ij}$ is applied either to a fixed contact 83b coupled to R attenuator 85 or a fixed contact 83c coupled to output terminal 87. Switch 84 functions to selectively connect a fixed contact 84a to which color evaluating value $b_{ij}$ is applied either to a fixed contact 84b coupled to B attenuator 86 or a fixed contact 84c coupled to output terminal 88. Switches 83 and 84 are synchronously switched with switching signal S5 from contrast comparator 80. When switching signal S5 is at the L level, switches 83 and 84 are switched to the sides of fixed contacts 83c and 84c, respectively. In this position, the color evaluating values $r_{ij}$ and $b_{ij}$ of the corresponding region are provided to output terminals 87 and 88 without being attenuated. When switching signal S5 is at the H level, switches 83 and 84 are switched to the sides of fixed contacts 83b and 84b, respectively. In this position, color evaluating values $r_{ij}$ and $b_{ij}$ of the corresponding region are provided to R and B attenuators 85 and 86.

R and B attenuators 85 and 86 subtract a predetermined amount Z' from the applied color evaluating values $r_{ij}$ and $b_{ij}$ to calculate $r_{ij} - Z'$ and $b_{ij} - Z'$. The result is provided to output terminals 87 and 88.

Contrast threshold value N is a value set according to observation values for recognizing an object of single color. The attenuating amount Z' is a value set according to observation values when appropriate white balance is obtained where an object of single color occupies a large area in the picture.

The attenuated or non-attenuated color evaluating values provided from output terminals 87 and 88 are provided to picture evaluating circuit 28 of FIG. 10, where color evaluating values $V_b$ and $V_r$ of the entire picture are calculated, according to these former color evaluating values. The remaining operation is identical to that of the first embodiment of the FIG. 2 and the third embodiment of FIG. 7, and the description thereof will be omitted.

Figure 12:
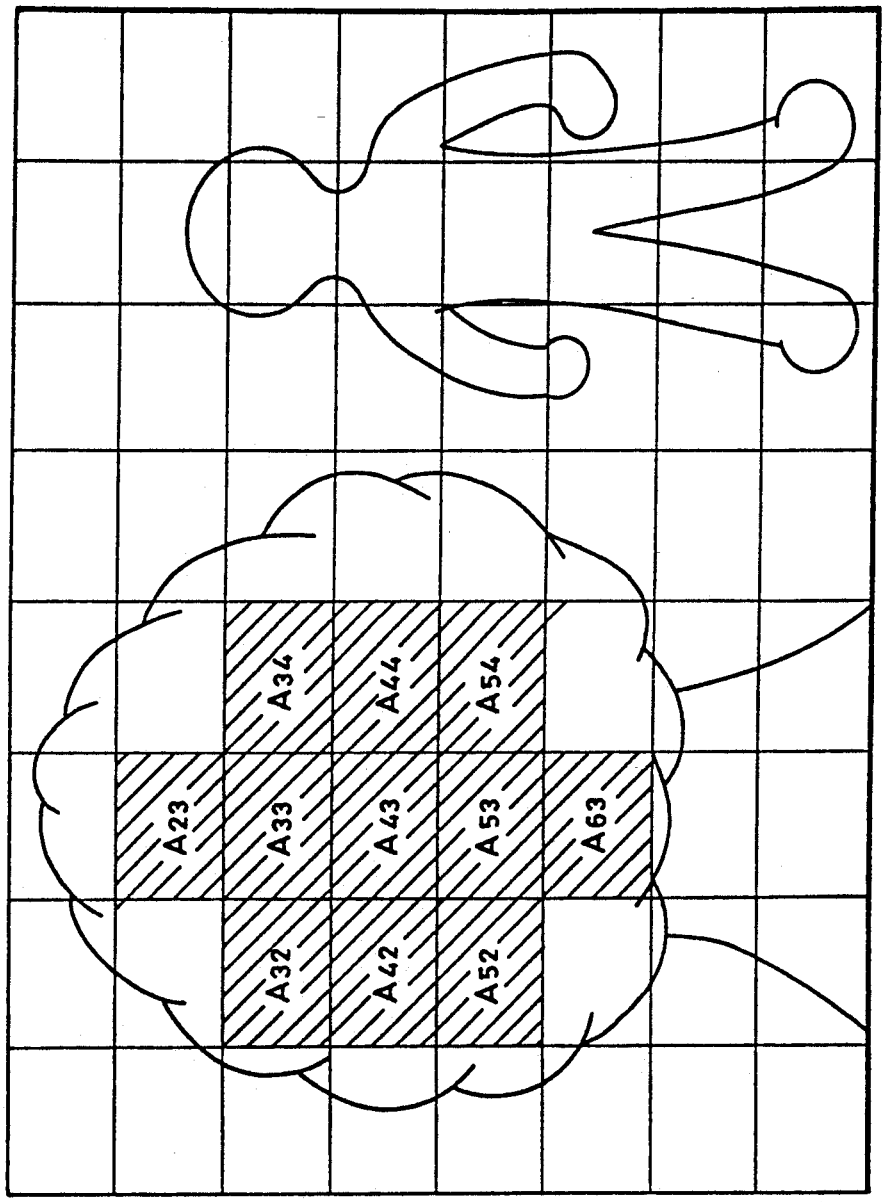
FIG. 12 is a schematic diagram for explaining the operation principle of the fourth embodiment of FIG. 10.

According to the fourth embodiment of the present invention, white balance is adjusted by attenuating the color evaluating values of the low contrast regions. For example, in the case of an image sensed picture of FIG. 12 where a tree having deep green leaves is taken, the color evaluating values $r_{ij}$ and $b_{ij}$ of the 11 regions indicated by the hatched area having only deep green leaves with low contrast, i.e., regions $A_{23}$, $A_{32}$-$A_{34}$, $A_{42}$-$A_{44}$, $A_{52}$-$A_{54}$, and $A_{63}$, are attenuated. Even in the case where a tree occupies a large area on the image sensed picture with uneven color distribution in the entire picture, the effect of the 11 green regions towards white balance of the entire picture is reduced to carry out the appropriate white balance adjustment. The adjustment is accomplished without white balance canceling the green components of the green leaves, that is, not balancing with a color intensity in the complementary color side of green.

Figure 13:
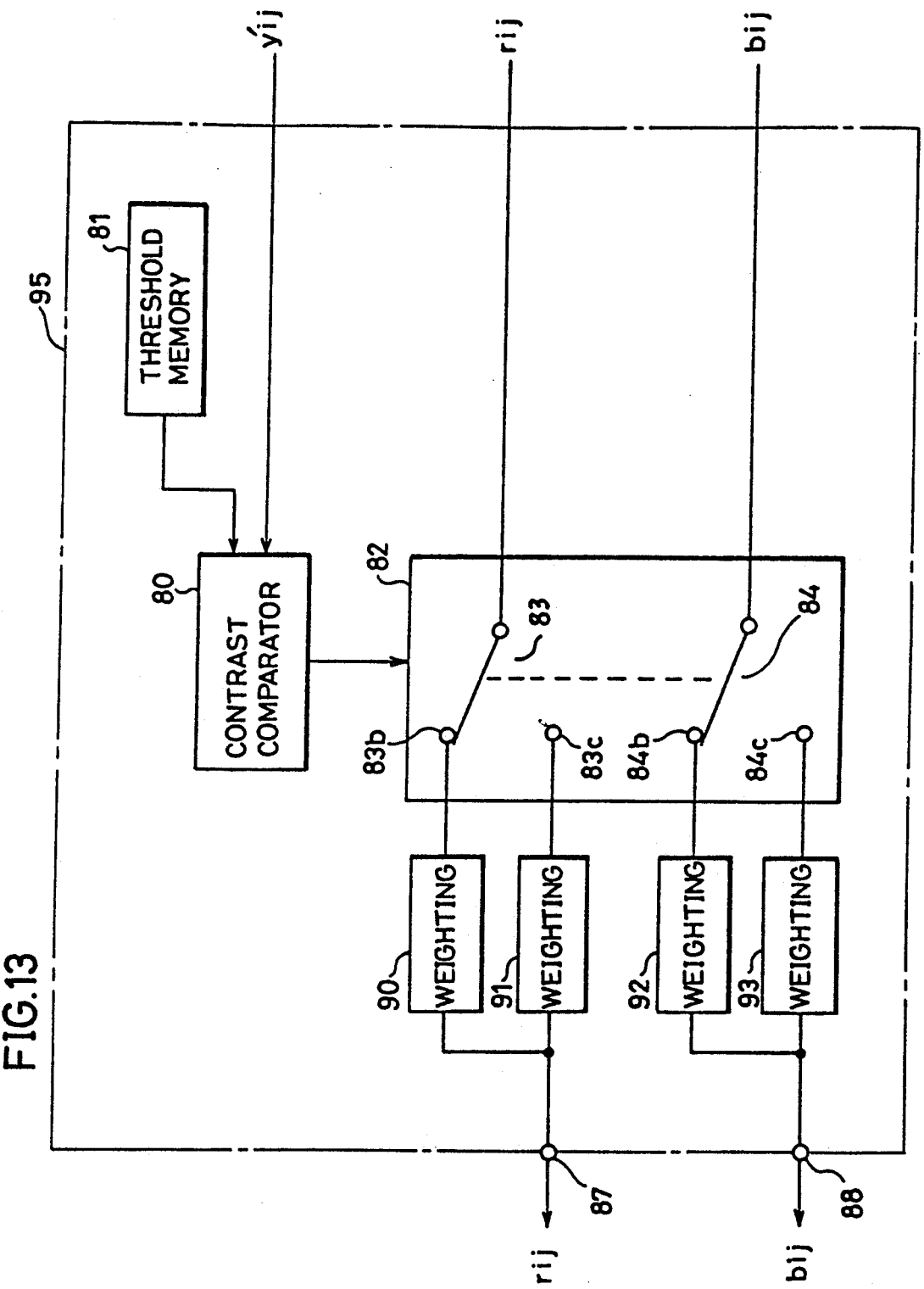
FIG. 13 is a block diagram showing another example of the color evaluating value adjusting circuit of FIG. 10.

FIG. 13 is a block diagram showing another example of color evaluating value adjusting circuit 95 of FIG. 10. The embodiment of FIG. 11 has taken the approach of reducing a predetermined attenuating amount Z' from color evaluating values $r_{ij}$ and $b_{ij}$ as an example of adjusting operation of color evaluating values in color evaluating value adjusting circuit 95. In the embodiment of FIG. 13, an approach using variable weighting amounts is employed.

Regarding high contrast regions, a predetermined weighting amount D1'' is weighted on color evaluating values by weighting circuits 91 and 93, that is, the multiplications of $r_{ij} \times D1''$ and $b_{ij} \times D1''$ are carried out. Regarding low contrast regions, weighting amount D2'' smaller than weighting amount D1'' is weighted by weighting circuits 90 and 92. That is to say, the multiplications of $r_{ij} \times D2''$ and $b_{ij} \times D2''$ are carried out. By providing these multiplied values as the adjusted color evaluating values of each region, it is possible to reduce the contribution degree of low contrast regions towards white balance adjustment.

According to the fourth embodiment of the present invention, it is possible to carry out appropriate white balance adjustment without white balance being intense in the direction to cancel a particular single color, even in the case where color area distribution of the image sensed picture is uneven due to an object of single color occupying a large area in the image sensed picture.

Figure 1:
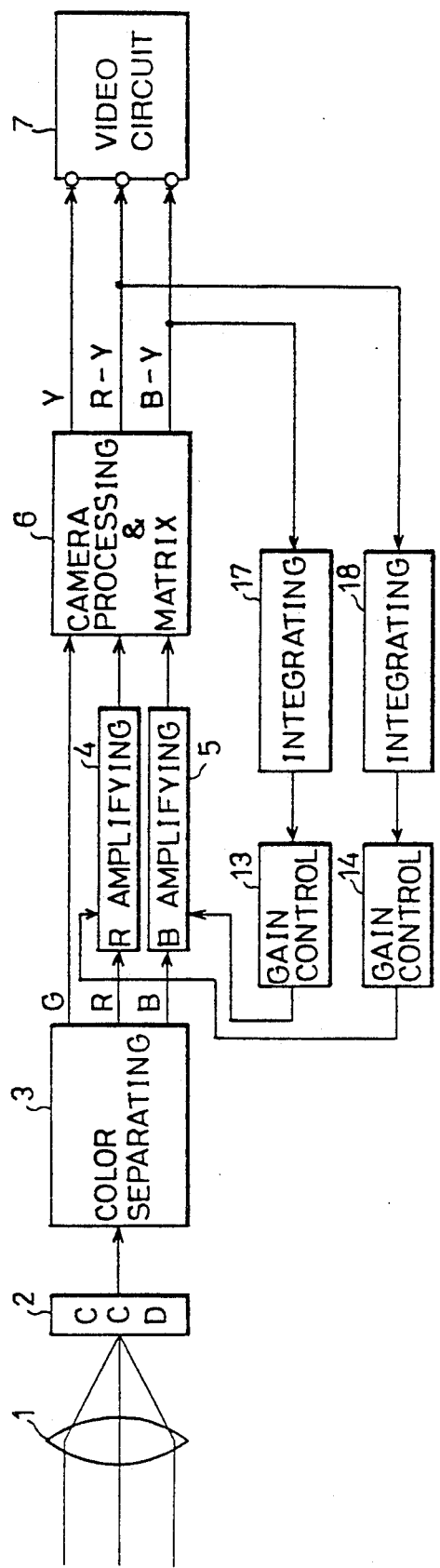
FIG. 1 is a block diagram of an example of a conventional white balance adjusting apparatus.
Figure 3:
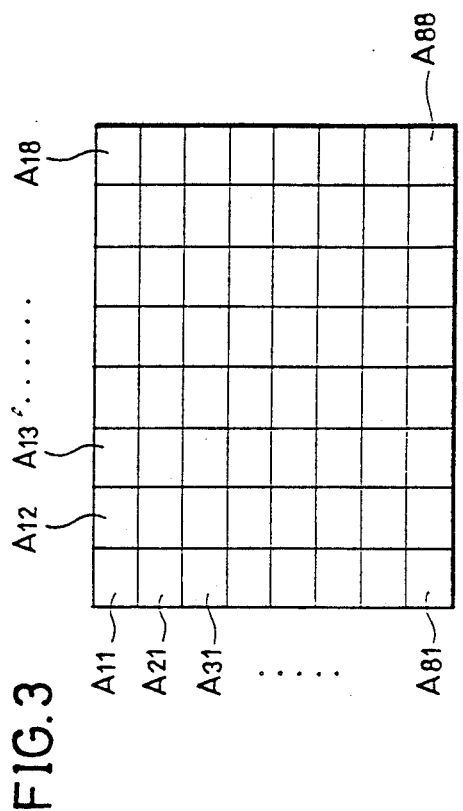
FIG. 3 is a diagram schematically showing the specified regions on the image sensed picture.
Figure 14:
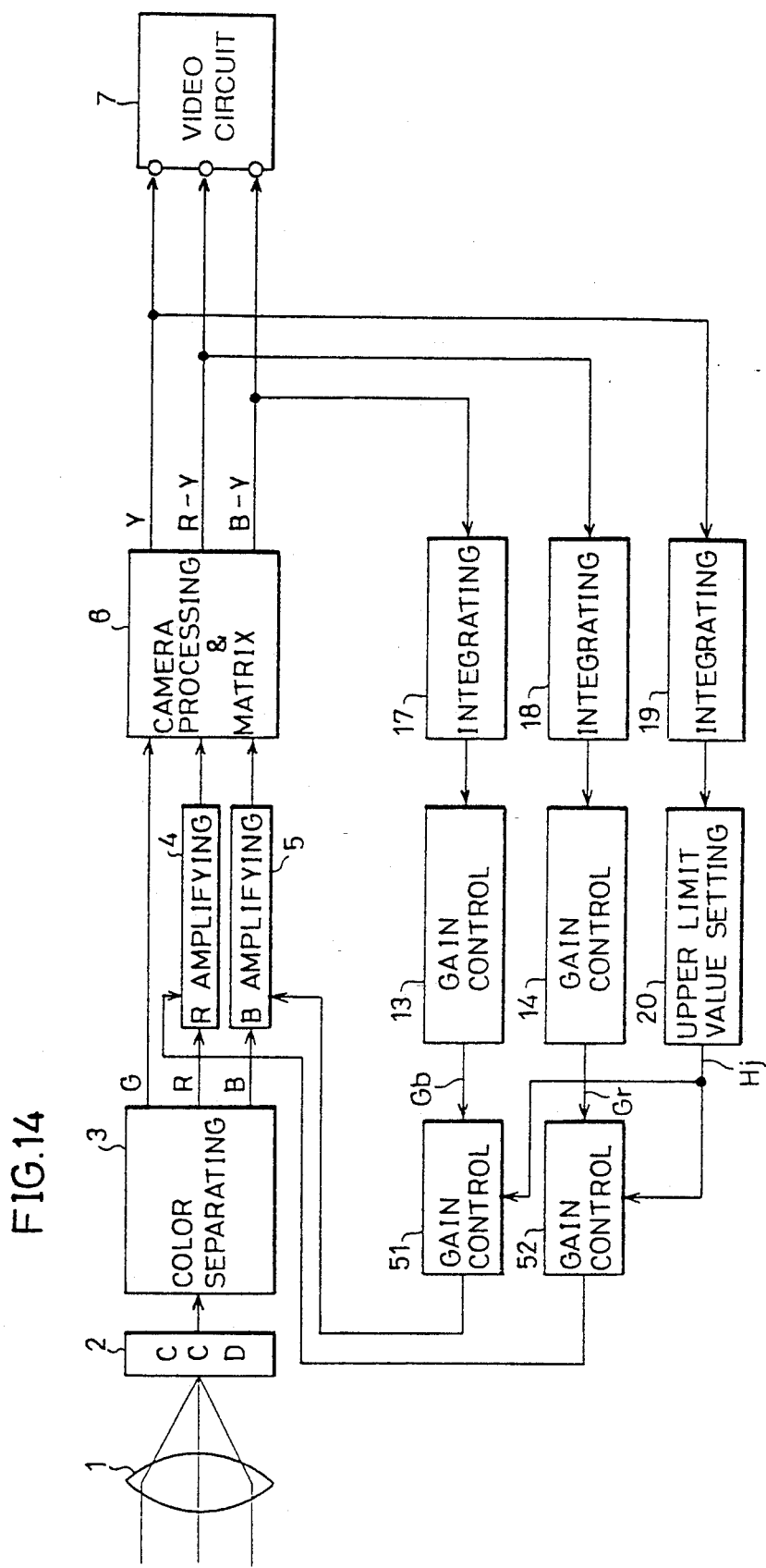
FIG. 14 is a block diagram of a white balance adjusting apparatus of a fifth embodiment of the present invention.

FIG. 14 is a block diagram showing a white balance adjusting apparatus of a fifth embodiment of the present invention. The fifth embodiment of FIG. 14 is the same as the conventional example of FIG. 1 except for the following points. That is, the luminance signal Y produced in camera processing and matrix circuit 6 is applied to integrating circuit 19, as well as to video circuit 7. The luminance signal Y corresponding to one picture is integrated.

An upper limit value setting circuit 20 sets the maximum value of the gain control amount by gain control circuits 51 and 52 according to the value resulting from the above mentioned integration.

Figure 15:
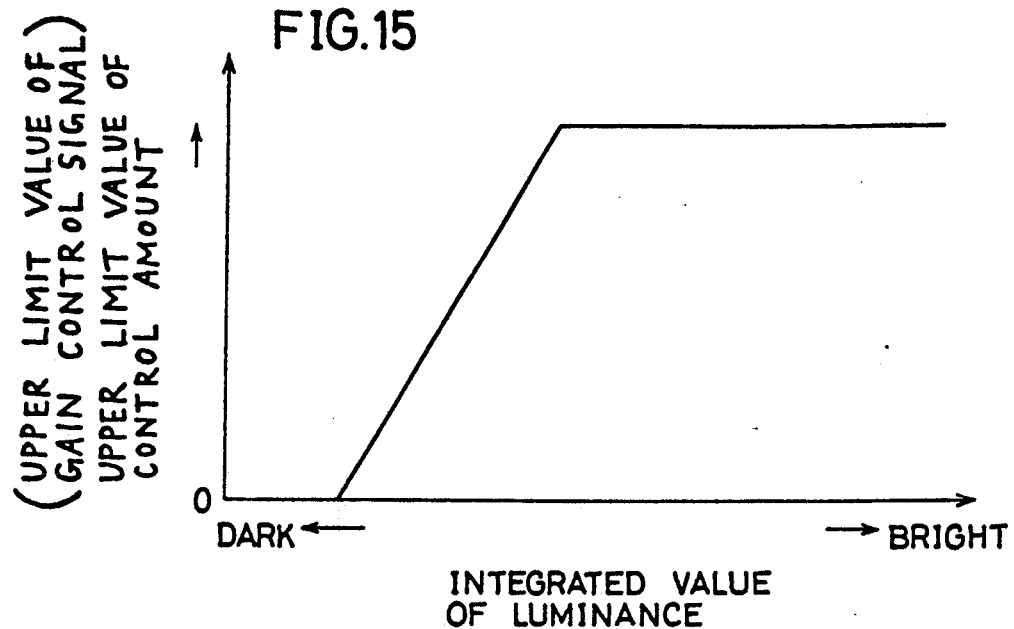
FIG. 15 is a graph for explaining the operation of the fifth embodiment of FIG. 14.

FIG. 15 is a graph showing the relation between the integrated value of luminance and the upper limit value of the gain control amount in the upper limit setting operation of upper limit value setting circuit 20. Referring to FIG. 15, the upper limit of gain control amount is fixed to 0 level, when the integrated value is extremely low. The upper limit value Hj increases in proportion to the integrated value. Upper limit value setting circuit 20 obtains upper limit value Hj of the gain control amount with respect to the entered luminance integrated value according to the graph of FIG. 15. Upper limit value Hj is provided to gain control circuits 51 and 52.

Gain control circuits 51 and 52 of FIG. 14 always monitor the levels of gain control signals $G_r$ and $G_b$ corresponding to the gain control amount, respectively. Gain control signals $G_r$ and $G_b$ are directly provided to amplifiers 4 and 5 when Gr and Gb are less than or equal to upper limit value Hj set by upper limit value setting circuit 20. When Gr and Gb are more than upper limit value Hj, each gain control signal is limited, where the set upper limit value itself is provided to amplifiers 4 and 5. This means that when the luminance level of the picture is low, the integrated value of the luminance signal is also low to reduce upper limit value Hj of the gain control amount. Particularly, when the picture is extremely dark, the upper limit value of the gain control amount becomes 0 to result in gain control signals $G_r$ and $G_b$ of 0. Unnecessary white balance adjustment is not carried out in this case due to the prohibition of gain control.

FIG. 16 is a block diagram showing a white balance adjusting apparatus of a sixth embodiment of the present invention. The sixth embodiment of FIG. 16 is the same as the second embodiment of FIG. 6 except for the following points.

That is, the latest luminance evaluating value $y_{ij}$ held in memory 26 is provided to weighting amount determining circuit 96, whereas color evaluating values $r_{ij}$ and $b_{ij}$ are provided to picture evaluating circuit 97.

Weighting amount determining circuit 96 detects regions where the luminance evaluating value is less than a predetermined value T to determine weighting amount $w_{ij}$ for each region regarding color evaluating value $r_{ij}$ and $b_{ij}$ according to the determination results. More specifically, weighting amount $w_{ij}$ is set to 1 in regions where the luminance evaluating value is equal or greater than a predetermined amount T, and to ½ in regions where the luminance evaluating value is less than a predetermined value T.

The predetermined value T is a luminance evaluating value set according to observation values for recognizing the offset of white balance where an object is of low luminance in the case where the weighting amounts of all regions are identical.

Picture evaluating circuit 97 calculates color evaluating values of the entire picture of color difference signals R-Y and B-Y as picture color evaluating values $V_r$ and $V_b$ using weighting amount $w_{ij}$ set by weighting amount determining circuit 96 for each region. The weighting amounts are applied according to the following equations (7) and (8).

$$V_r = \sum_{i=1}^{8}\sum_{j=1}^{8} (r_{ij} \times w_{ij}) / \sum_{i=1}^{8}\sum_{j=1}^{8} w_{ij} \quad (7)$$

$$V_b = \sum_{i=1}^{8}\sum_{j=1}^{8} (b_{ij} \times w_{ij}) / \sum_{i=1}^{8}\sum_{j=1}^{8} w_{ij} \quad (8)$$

The above equations will be described briefly. In equation (7), $$\sum_{i=1}^{8}\sum_{j=1}^{8} (r_{ij} \times w_{ij})$$

is the total sum of the multiplication results of all 64 regions, upon multiplying and weighting color evaluating values $r_{ij}$ of the 64 regions by the corresponding weighting amount $w_{ij}$. Normalization by the weighting amount is carried out by dividing the above total sum by $$\sum_{i=1}^{8}\sum_{j=1}^{8} w_{ij}$$

which is the total sum of the weighting amount of all regions. By summation and multiplying color evaluating values $r_{ij}$ of color difference signal R-Y over the entire picture using weighting amount $w_{ij}$, picture color evaluating value $V_r$ having the area factor removed is calculated. The above description regarding equation (7) may similarly be applied to equation (8).

The remaining operation is identical to that of the aforementioned first embodiment, and the description thereof will be omitted.

Figure 17:
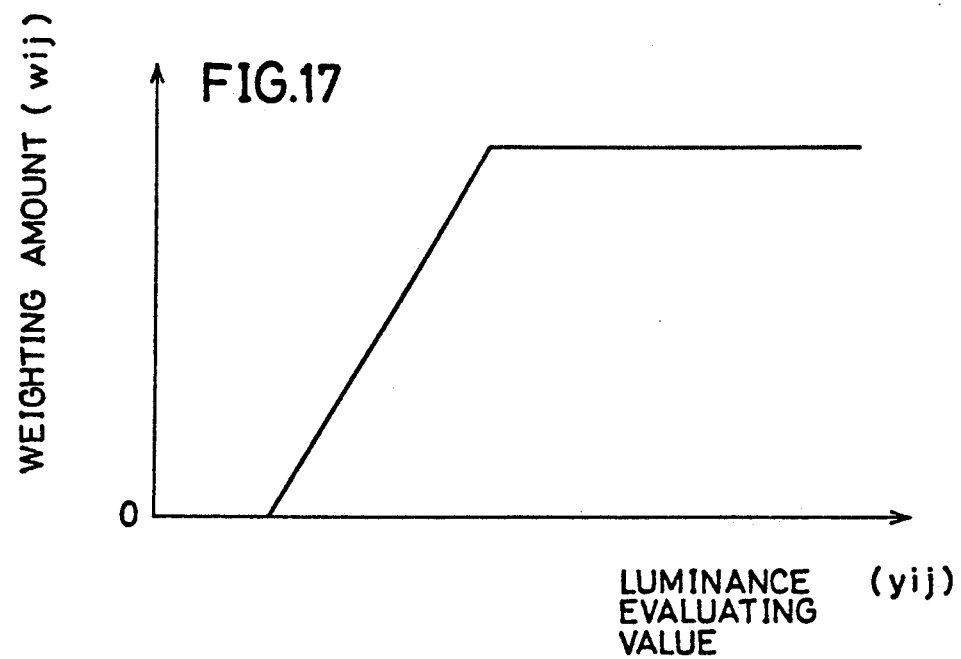
FIG. 17 is a graph explaining the operation of the sixth embodiment of FIG. 16.

Although the sixth embodiment is implemented to select either 1 or ½ as the weighting amount, it is possible to implement the apparatus to select an optimum value from sequential weighting amount varying according to the luminance evaluating value as shown in the graph of FIG. 17, set in advance according to an observation value.

Although the upper limit value of the gain control amount is set in the above mentioned fifth embodiment, an approach could be taken to lengthen the time constant of gain variation, or to cease the gain control itself.

According to the aforementioned fifth and sixth embodiments, it is possible to suppress the offset of white balance to a minimum with respect to objects having extremely low luminance by limiting the contribution of the low luminance object towards white balance adjustment of the entire picture.

It is possible to use digital integrator 23 of FIG. 4 as integrator 19 of the fifth embodiment of FIG. 14. In this case, the output of digital integrator 23 is the average value of the luminance evaluating values of the 64 regions.

The above embodiments are implemented to select one color difference signal or a luminance signal for every 1 field using selecting circuit 21 due to the common use of A/D converter 22. Therefore the update period of the evaluating values of each signal components are 3 fields. However, it is possible to carry out white balance adjustment of higher accuracy by providing an A/D converter and an integrator for each of luminance signal and color difference signals to allow update of each evaluating value for every 1 field.

It is also possible to carry out the determination using fuzzy inference considering that various determinations of the aforementioned embodiments comprise vagueness.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A white balance adjusting apparatus for automatically adjusting white balance in response to a luminance information signal and a plurality of color information signals obtained from imaging sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means for integrating said luminance information signal and respective ones of said plurality of amplified color information signals to convert said luminance information signal and said amplified color information signals into a luminance evaluating value and color evaluating values, respectively, for each of said plurality of regions, means for controlling the variable gain of said amplifying means according to each of said color evaluating values of each of said plurality of regions, and means for adjusting each of said color evaluating values in response to said luminance evaluating value.

2. The white balance adjusting apparatus according to claim 1, wherein said adjusting means comprises means for reducing each color evaluating value by a predetermined amount in regions where said luminance evaluating value is greater than a predetermined value.

3. The white balance adjusting apparatus according to claim 1, wherein said adjusting means further comprises means for weighting each of said color evaluating value in each of said plurality of regions with a weighting amount of the corresponding region, and means for reducing the weighting amount in regions where said luminance evaluating value is greater than a predetermined value, in comparison with the weighting amounts of other regions.

4. The white balance adjusting apparatus according to claim 1, wherein said color information signals comprise at least red and blue color difference signals.

5. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means for integrating said luminance information signal and respective ones of said plurality of amplified color information signals so as to convert said luminance information signal and said amplified color information signals into a luminance evaluating value and color evaluating values, respectively, for each of said plurality of regions, means for controlling the variable gain of said amplifying means according to each of said color evaluating values within each of said plurality of regions, and means, operative in conjunction with said variable gain controlling means, for reducing a contribution degree of each of said color evaluating values in specified regions, for control of said variable gain, when the luminance evaluating value and a specified color evaluating value in said specified regions are greater than respective predetermined values.

6. The white balance adjusting apparatus according to claim 5, wherein said reducing means comprises means for reducing each of said color evaluating values by a predetermined amount in specified regions where said luminance evaluating value and said specified color evaluating value are respectively greater than predetermined values.

7. The white balance adjusting apparatus according to claim 5, wherein said reducing means further comprises means for weighting each of said color evaluating values in each of said plurality of regions by a weighting amount for the corresponding region, and means for reducing the weighting amount in specified regions where said luminance evaluating value and said specified color evaluating value are greater than predetermined values, in comparison with the weighting amounts of other regions.

8. The white balance adjusting apparatus according to claim 5, wherein said converting means comprises means for digital-integrating said luminance information signal and each of said plurality of amplified color information signals by 1 field period, and memory means for holding the resulting digital-integrated value for said luminance information signal and each of said amplified color information signals.

9. The white balance adjusting apparatus according to claim 5, wherein said color information signals comprise at least red and blue color difference signals.

10. A white balance adjusting apparatus for automatically adjusting white balance in response to a luminance information signal and a plurality of color information signals obtained from image sensing means having a lens and an image sensing device, comprising:

means for amplifying each of said color information signal by a corresponding variable gain so as to yield a corresponding plurality of color information signals, means for dividing a picture produced by said image sensing device into a plurality of regions, means for integrating each of said plurality of amplified color information signals so as to convert said amplified color information signals into a color evaluating value for each of said plurality of regions, means, operative in response to said luminance information signal, for extracting a high frequency component from said luminance information signal so as to form an extracted level and, in response to said extracted level, generating a contrast evaluating value indicative of contrast for each of said plurality of regions, means for controlling the variable gain of said amplifying means according to each of said color evaluating values within each of said plurality of regions, and means, operative in conjunction with said variable gain controlling means, for reducing a contribution degree of each of said color evaluating values, for control of said variable gain, in regions where said contrast evaluating value is smaller than a predetermined value.

11. The white balance adjusting apparatus according to claim 10, wherein said reducing means comprises means for reducing each of said color evaluating values by a predetermined amount in regions where said contrast evaluating value is smaller than a predetermined value.

12. The white balance adjusting apparatus according to claim 10, wherein said reducing means further comprises
means for weighting each of said color evaluating values in each of said plurality of regions with a weighting amount of the corresponding region, and
means for reducing the weighting amount in regions where said contrast evaluating value is smaller than a predetermined value, in comparison with the weighting amounts of other regions.

13. The white balance adjusting apparatus according to claim 10, wherein said converting means comprises
means for digital-integrating said luminance information signal and each of said plurality of amplified color information signals by 1 field period, and
memory means for holding the resulting digital-integrated value for said luminance information signal and each of said amplified color information signals.

14. The white balance adjusting apparatus according to claim 10, wherein said color information signals comprise at least red and blue color difference signals.

15. A white balance adjusting apparatus for automatically adjusting white balance in response to a luminance information signal and a plurality of color information signals obtained from image sensing means having a lens and an image sensing device, comprising:
means for amplifying each of said color information signals with a corresponding variable gain so as to yield a corresponding plurality of amplified color information signals,
means for integrating each of said plurality of amplified color information signals so as to yield an integrated color information signal,
means, responsive to said integrated color information signals, for controlling the variable gain of said amplifying means according to said integrated color information signal,
means for limiting the control of said variable gain according to said luminance information signal,
means for integrating said luminance information signal so as to yield an integrated luminance information signal, and
means for setting an upper limit of the control amount of said variable gain according to said integrated luminance information signal.

16. The white balance adjusting apparatus according to claim 15, further comprising means for prohibiting control of said variable gain when said integrated luminance information signal is smaller than a predetermined value.

17. A white balance adjusting apparatus for automatically adjusting white balance in response to a luminance signal and a plurality of color difference signals, comprising:
means for amplifying each of a plurality of color signals produced by an image sensing device with a corresponding variable gain so as to yield a corresponding plurality of amplified color signals,
means for dividing a picture produced by said image sensing device into a plurality of regions,
means for converting said plurality of amplified color signals into said luminance signal and said plurality of color difference signals,
means for integrating said luminance signal and respective ones of said plurality of color difference signals so as to convert the luminance signal and the color difference signals into a luminance evaluating value and color evaluating values, respectively, for each of said plurality of regions,
means for controlling the variable gain of said amplifying means according to each of said color evaluating values within each of said plurality of regions, and
means, operative in conjunction with said variable gain controlling means, for reducing a contribution degree of each of said color evaluating values, for control of said variable gain, in regions where said luminance evaluating value is greater than a predetermined value.

18. A white balance adjusting apparatus for automatically adjusting white balance in response to a luminance signal and a plurality of color difference signals, comprising:
means for amplifying each of a plurality of color signals produced by an image sensing device with a corresponding variable gain so as to yield a corresponding plurality of amplified color signals,
means for dividing a picture produced by said image sensing device into a plurality of regions,
means for converting said plurality of amplified color signals into said luminance signal and said plurality of color difference signals,
means for integrating said luminance signal and respective ones of said plurality of color difference signals so as to convert the luminance signal and the color difference signals into a luminance evaluating value and color evaluating values, respectively, for each of said plurality of regions,
means for controlling the variable gain of said amplifying means according to each of said color evaluating values within each of said plurality of regions, and
means, operative in conjunction with said variable gain controlling means, for reducing a contribution degree of each color evaluating value in specified regions, for control of said variable gain, when the luminance evaluating value and a specified color evaluating value in said specified regions are greater than respective predetermined values.

19. A white balance adjusting apparatus for automatically adjusting white balance in response to a luminance signal and a plurality of color difference signals, comprising:
means for amplifying each of a plurality of color information signals produced by an image sensing device by a corresponding variable gain so as to yield a corresponding plurality of amplified color signals,
means for dividing a picture produced by said image sensing device into a plurality of regions,
means for converting said plurality of amplified color signals into said luminance signal and said plurality of color difference signals,
means for integrating each of said plurality of color difference signals so as to convert the color difference signals into a color evaluating value for each of said plurality of regions,
means, operative in response to said luminance signal, for extracting a high frequency component from said luminance signal so as to form an extracted level and, in response to said extracted level, generating a contrast evaluating value indicative of contrast for each of said plurality of regions, means for controlling the variable gain of said amplifying means according to each of said color evaluating values within each of said plurality of regions, and means, operative in conjunction with said variable gain controlling means, for reducing a contribution degree of each color evaluating value, for control of said variable gain, in regions where said contrast evaluating value is smaller than a predetermined value.

20. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means, responsive to said luminance information signal and each of said amplified color information signals for generating, for each of said regions, a luminance evaluating value and corresponding color evaluating values, means for averaging corresponding ones of said color evaluating values across said regions so as to yield respective picture color evaluating values, means for controlling each of the corresponding variable gains of said amplifying means in response to a corresponding one of said picture color evaluating values, and means, operative in conjunction with said averaging means, for adjusting said color evaluating values for each of said regions in response to a corresponding one of said luminance evaluating values.

21. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means, responsive to said luminance information signal and each of said amplified color information signals for generating, for each of said regions, a luminance evaluating value and corresponding color evaluating values, means for calculating a picture color evaluating value in response to each of said plurality of amplified color information signals, by weighting each color evaluating value within each of said plurality of regions by a weighting amount for each of said regions, means for controlling the variable gain of said amplifying means according to said picture color evaluating value, and means for determining the weighting amount of each region according to said luminance information signal corresponding to each of said plurality of regions.

22. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means, responsive to said luminance information signal and each of said amplified color information signals for generating, for each of said regions, a luminance evaluating value and corresponding color evaluating values, means for controlling the variable gain of said amplifying means according to each of said color evaluating values within each of said plurality of regions, and means, operative in conjunction with said variable gain controlling means, for reducing a contribution degree of each color evaluating value in specified regions, for control of said variable gain, when the luminance evaluating value and a specified color evaluating value in said specified regions are greater than respective predetermined values.

23. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means, responsive to said luminance information signal and each of said amplified color information signals, for generating, for each of said regions, a luminance evaluating value and corresponding color evaluating values, means, responsive to said luminance information signal, for calculating a contrast evaluating value indicating the contrast of an object for each of said plurality of regions according to said luminance information signal, means for controlling the variable gain of said amplifying means according to each of said color evaluating values within each of said plurality of regions, and means, operating in conjunction with said variable gain controlling means, for reducing a contribution degree of each color evaluating value, for control of said variable gain, in ones of said regions where said contrast evaluating value is smaller than a predetermined value.

24. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means for integrating said luminance information signal and respective ones of said amplified color information signals so to convert said luminance information signal and said color information signals into a luminance evaluating value and color evaluating values, respectively, for each of said plurality of regions, means for calculating a picture color evaluating value in response to each of said plurality of amplified color information signals, by weighting each of said color evaluating values within each of said plurality of regions by a weighting amount for each region, means for controlling the variable gain of said amplifying means according to said picture color evaluating value, and means for setting the luminance evaluating value of each of said regions as the weighting amount for said each region, 25. A white balance adjusting apparatus for automatically adjusting white balance in response to a luminance information signal and a plurality of color information signals obtained from image sensing means having a lens and an image sensing device, comprising:

means for amplifying each of said color information signals with a corresponding variable gain so as to yield a corresponding plurality of amplified color information signals, means for dividing a picture produced by said image sensing device into a plurality of regions, means for integrating said luminance information signal and respective ones of said amplified color information signals so as to convert said luminance information signal and said color information signals into a luminance evaluating value and color evaluating values, respectively, for each of said plurality of regions, means for calculating a picture color evaluating value in response to each of said plurality of amplified color information signals, by weighting each of said color evaluating values within each of said plurality of regions by a weighting amount for each region, means for controlling the variable gain of said amplifying means according to said picture color evaluating value, and means for determining the weighting amount of each region according to said luminance information signal for each of said plurality of regions, wherein said determining means comprises means for reducing the weighting amount in one of said regions where said luminance evaluating value for said one region is smaller than a predetermined value in comparison with the weighting amounts of other ones of said regions.

* * * * *